United States Patent [19]

Roach et al.

[11] Patent Number: 4,747,100

[45] Date of Patent: May 24, 1988

[54] TOKEN PASSING NETWORK UTILIZING ACTIVE NODE TABLE

[75] Inventors: J. Monte Roach, Ann Arbor, Mich.; Lester A. Jones, Mentor, Ohio; Wayne C. Van Sickle, South Euclid, Ohio; Ronald E. Schultz, Solon, Ohio

[73] Assignee: Allen-Bradley Company, Inc., Milwaukee, Wis.

[21] Appl. No.: 895,267

[22] Filed: Aug. 11, 1986

[51] Int. Cl.$^4$ ................................................ H04J 3/26
[52] U.S. Cl. .......................................... 370/86; 370/89
[58] Field of Search ................ 370/89, 86; 340/825.51

[56] References Cited

U.S. PATENT DOCUMENTS

| | | | |
|---|---|---|---|
| 4,491,946 | 1/1985 | Kryskow, Jr. et al. | 370/89 |
| 4,506,360 | 3/1985 | Kryskow, Jr. et al. | 370/85 |
| 4,556,974 | 3/1985 | Kozlik | 370/89 |
| 4,583,088 | 4/1986 | Bux et al. | 370/86 |
| 4,649,535 | 3/1987 | Ulug | 370/86 |
| 4,667,323 | 5/1987 | Engdahl et al. | 370/85 |

OTHER PUBLICATIONS

IEEE Standard 802.4–1984; Token Passing Bus Access Method and Physical Layer Specification Draft F, Jul. 1984.

Proway Local Area Network–Draft Standard Instrument Society of America, Jan. 1984.

Primary Examiner—Douglas W. Olms
Assistant Examiner—Min Jung
Attorney, Agent, or Firm—Quarles & Brady

[57] ABSTRACT

A programmable controller is adapted to communicate in a token passing logical ring network in a peer-to-peer fashion. The programmable controller is a station on the network and contains an interface which implements the network protocol. The protocol requires that each station maintain an Active Node Table which stores a complete map of the logical ring and the order in which the token is passed. The Active Node Table is automatically updated by monitoring each token pass on the network, where each token pass identifies the source and destination of the token pass. The Active Node Table is used in performing all routine network maintenance functions, including passing the token, adding stations, and dropping stations. The Active Node Table allows the formation of an Active Node Status Word for use by high level processes within the station. The Active Node Table also facilitates the inclusion of data in the token pass message.

15 Claims, 18 Drawing Sheets

ACTIVE NODE TABLE
ADDING A STATION IN THE LOGICAL RING

| | | LOW ORDER 3 BITS | | | | | | |
|---|---|---|---|---|---|---|---|---|
| | | $\phi$ | 1 | 2 | 3 | 4 | 5 | 6 | 7 |
| HIGH ORDER 3 BITS | $\phi$ | | | | | | | | |
| | 1 | | $16_8$ | | | | | $23_8$ | |
| | 2 | | | | $32_8$ ~~$46_8$~~ | | | | |
| | 3 | | | | $46_8$ | | | | |
| | 4 | | | | | | | $55_8$ | |
| | 5 | | | | | | $11_8$ | | |
| | 6 | | | | | | | | |
| | 7 | | | | | | | | |

ADDING A STATION TO THE LOGICAL RING

PEER COMMUNICATIONS LINK (PCL) NETWORK

ACTIVE NODE TABLE

ADDING A STATION
TO THE LOGICAL RING

ACTIVE NODE TABLE
ADDING A STATION IN THE LOGICAL RING

DROPPING A STATION FROM THE LOGICAL RING

ACTIVE NODE TABLE
DROPPING A STATION FROM THE LOGICAL RING

VIRTUAL I/O W/R TABLE

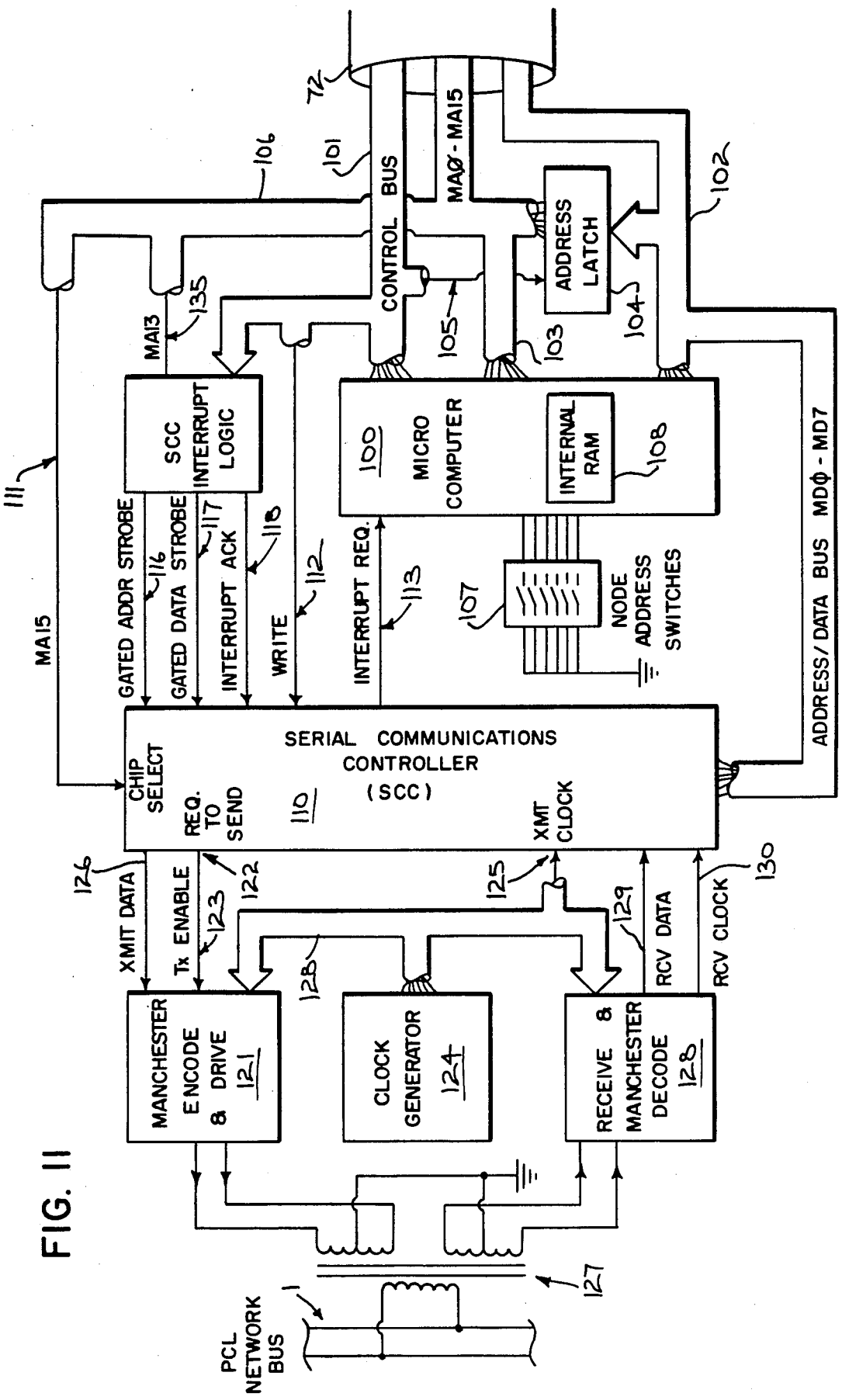

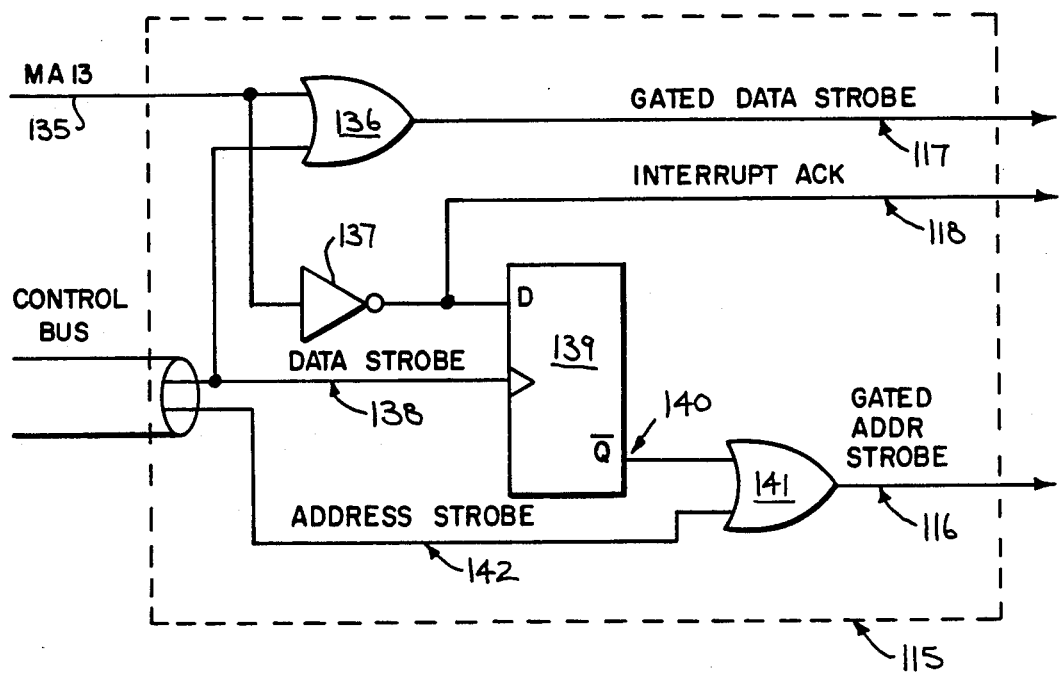
FIG. 12 SCC INTERRUPT LOGIC
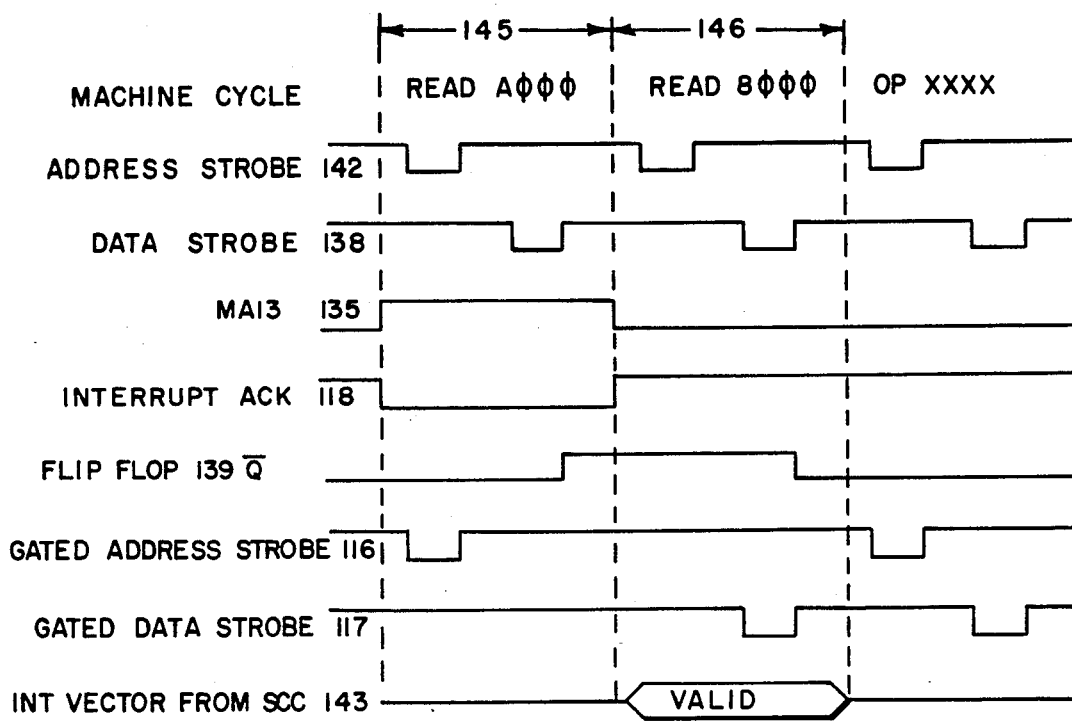
FIG. 13 SCC INTERRUPT LOGIC TIMING DIAGRAM

MICROCOMPUTER INTERNAL RAM

TOKEN PASSING NETWORK UTILIZING ACTIVE NODE TABLE

BACKGROUND OF THE INVENTION

The field of the invention is token passing logical ring networks, and particularly, to token passing logical ring networks for communications among industrial control systems such as process controls, numerical controls, and programmable controllers.

Token passing logical ring networks are comprised of two or more nodes, or stations, which are linked together by a communications media. The communications media may take a number of forms, including coaxial cable, fiber optics, or twisted wire pairs. The topology of the links between stations may also take a number of forms, including star, multidrop, or ring configurations.

Regardless of the media used or the topology of the network, a control scheme is required to provide an orderly transfer of information from one station to another on the network. There have been many varieties of control schemes developed for such networks, which has resulted in a lack of standardization in the industry. In an attempt to define a standard for token passing logical rings, the Institute of Electrical and Electronic Engineers (IEEE) has developed IEEE Standard 802.4, entitled Token Passing Bus Access Method and Physical Layer Specification. That standard sets forth the basic operating procedures to be followed by compliant networks.

As the IEEE 802.4 standard is a relatively new attempt to standardize token passing networks, there are few networks which adhere to it fully. However, many prior networks are based on common precepts which eventually led up to the 802.4 standard. The most common of these precepts is the method by which the stations are linked together to form the logical ring. In prior networks, each station maintains one pointer to the next station in the ring and a second pointer to the previous station in the ring. In other words, each station knows who its successor station is and who its predecessor station is; the station has no other information about the logical ring. To pass the token, the station currently holding the token sends a specifically addressed message to its successor station, the message being identified as a token pass by a distinctive control code. Thus the token repeatedly circulates around the logical ring.

In prior networks, the information in each station indicating the predecessor station is only used in the event that one station in the logical ring fails to accept the token. In that event, a recovery procedure is followed which involves sending a query (who's next?) to all subsequent stations asking which station had the failed station as a predeceessor. If a station responds to the query (I'm next), the station passing the token sends a message to the responding station (load your predecessor) and the responding station sends a message to the passing station (load your successor). The failed station is thus patched out of the logical ring. The token is then passed to the responding station.

While this process is generally satisfactory, it is not efficient in that it requires a series of messages to be passed back and forth on the network which reduces the throughput available for message traffic. The exact process may vary for different networks, but in all prior networks, many different types of messages are required for routine network maintenance functions. Further, if two consecutive stations fail, this procedure cannot recover and the network must be reinitialized or a search procedure conducted for the new successor.

A further limitation of prior token passing networks is that because each station knew only its successor and predecessor, token passes among other stations were ignored. It was thus not practical to broadcast useful data in the token pass message itself.

Token passing logical ring networks are desirable for industrial control applications because token rotation time and throughput can be accurately estimated. In such an industrial control environment, token passing logical ring networks can be used for example to exchange information among several controllers acting in coordination to implement a higher level process. In such applications, it is desireable for each controller in the system to know which other stations are currently operating on the network, so that the appropriate actions can be taken. To acquire such information in prior systems, it was necessary for each station to explicitly transmit its on line status as a high level message to other stations on the network, which of course reduced the network availability for other message traffic.

SUMMARY OF THE INVENTION

The present invention relates to a token passing logical ring network which employs a plurality of stations that are connected logically in a ring by the passing of a token between the stations. The station in possession of the token at any given moment is enabled to exercise control over the network media. In a network of the present invention, each station contains an Active Node Table which stores a complete map of the logical ring and the order in which the token is passed. The Active Node Table at each station is updated as each token pass occurs. Each token pass message contains the source of the token pass (i.e. the current token holder) and the destination of the token pass (i.e. the station to which the token is being passed). By monitoring all such token pass messages at each station, the complete map of the logical ring including the order in which the token is passed is constructed. The Active Node Table at each station is also used to determine which station to pass the token when passing the token.

One object of the present invention is to simplify routine network maintenance operations such as adding and dropping stations through the use of an Active Node Table. A solicit message is used to invite other stations to join the logical ring. The token pass and solicit message types are the only two message types needed for all network maintenance functions. Stations are added by soliciting until a new station is found and then passing the token to the new station. All of the Active Node Tables in each station are updated automatically when the token pass occurs. Stations are dropped from the logical ring by looking up in the Active Node Table the address of the next successor and then passing it the token.

Another object of this invention is the ability to tolerate multiple consecutive station failures without reinitializing the network. Because the Active Node Table stores a complete map of the logical ring, a successor can be found no matter how many consecutive stations fail. If a station fails to accept the token, it is dropped from the logical ring and a new successor is found from the Active Node Table. Should that new successor also fail to accept the token, it too is dropped from the logical ring and another successor is found from the Active Node Table. This iterative process can be carried out until all possible successors on the logical ring have been exhausted (i.e. only the station holding the token remains).

Still another object of this invention is the formation of an Active Node Status Word (ANSW) at each station based on the information contained in the Active Node Table. The ANSW is used to indicate which stations are currently in the logical ring. The ANSW can then be used by high level decision making processes within the station to take action based on the availability of resources on the logical ring.

Yet another object of this invention is to broadcast useful data in the token pass messages themselves. Each station monitors all token pass messages to update their Active Node Tables. During the monitoring process, data included in the token pass message is extracted and used to construct a specialized data table containing all the data so extracted from each station. The specialized data table then represents an auxillary, or virtual, communications facility provided without the overhead of transmitting high level messages.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

BRIEF DESCRIPTION OF THE DRAWINGS

FIG. 11 is an electrical schematic diagram of the microcomputer system which forms part of the programmable controller of FIG. 7;

FIG. 12 is an electrical schematic diagram of the SCC interrupt logic circuit which forms part of the microcomputer system of FIG. 11;

FIG. 13 is a timing diagram for the SCC interrupt logic circuit of FIG. 12;

GENERAL DESCRIPTION OF THE INVENTION

A complex industrial process may require more than one controller, each operating in a coordinated fashion. This requires that the controllers, and other elements of the system, communicate with their peers exchanging commands, reports, and status. A network type of communication is best suited for this function because it allows flexible communications between any elements in the system. This invention relates to such a network which is aptly referred to herein as a Peer Communications Link (PCL) network.

Figure 1:
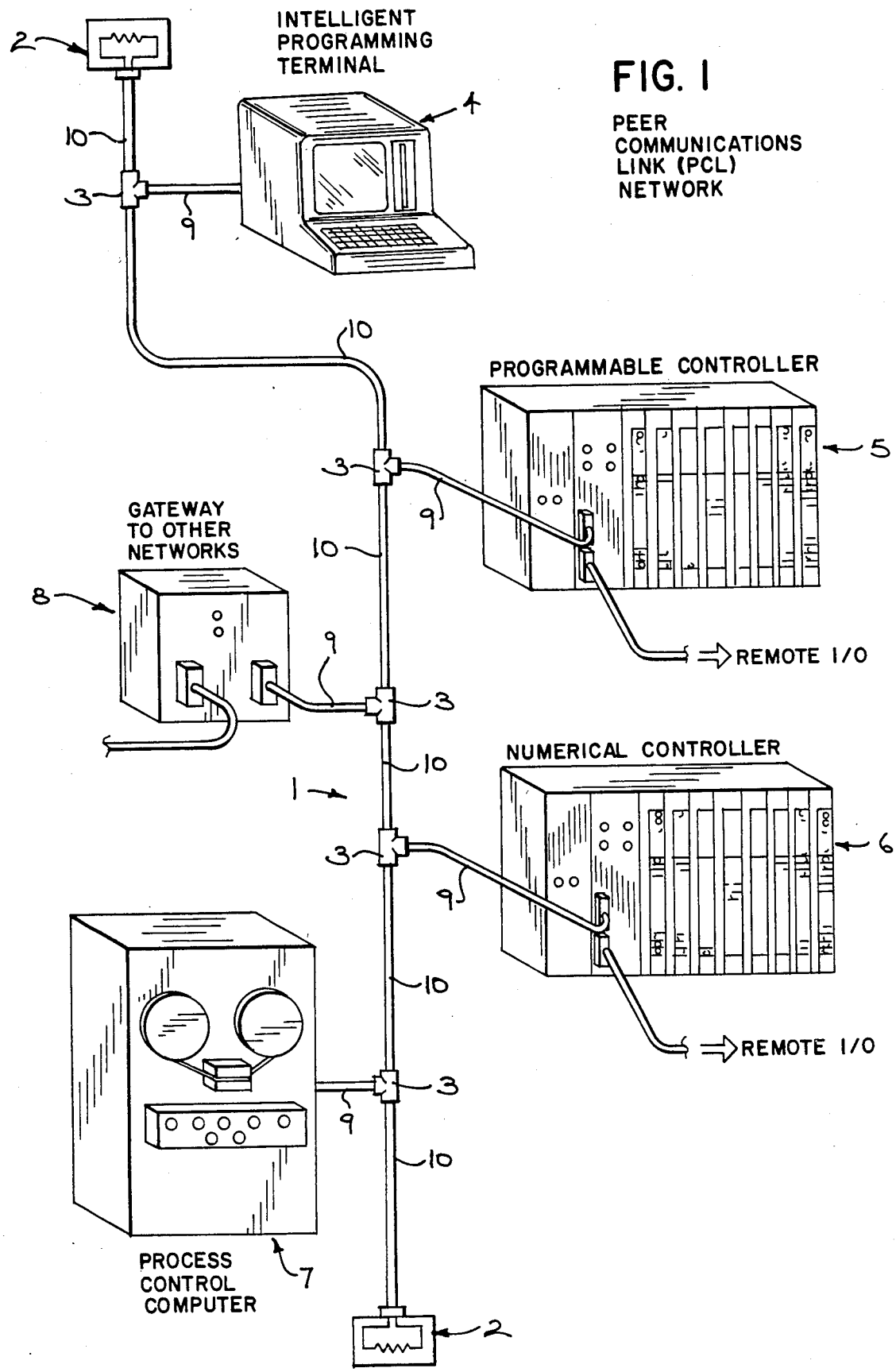
FIG. 1 is a perspective view of a communications network which employs the present invention.

Referring to FIG. 1, an example PCL network includes a bus 1 with passive terminations 2 at each end and taps 3 into the bus 1 at various points for connection of the equipments to be included in the link. This example network has connected an intelligent programming terminal 4, a programmable controller 5, a numerical controller 6, a process control computer 7, and a gateway 8 to other networks (not shown). For purposes of communicating on the bus 1, each of the equipments mentioned above is considered a "station" on the bus 1. Each such station has a unique address on the bus 1 which is used to identify the source and destination for message traffic on the bus. The station address is also used to organize the stations on the bus 1 into a logical ring. The logical ring is merely the sequence which is used to take turns for control of the bus. To transfer control of the bus to the next station in the logical ring, a distinctive control code is sent to the next station. That control code means "you now have control of the bus" and such a control code is called a token.

Token passing logical rings are well known in the art as a means for implementing an orderly discipline for control of a shared broadcast communications media. In a token passing logical ring, only one station has control over the media at any one time. Control over the media can include transmitting messages and commanding other stations to transmit a response. That station having control over the media is said to possess the "token" at that time. When the station having the token is finished performing the tasks for which it required control over the media, it "passes" the token to another station. The token thus passes from station to station in some ordered manner, usually in order of increasing station address and then back to the lowest address thereby forming a logical ring. The order in which the token is passed is completely independent of the physical media and the physical arrangement of the stations on the media. It should be apparent to those skilled in the art that this logical ring configuration is independent of the particular media (wire, cable, fiber optics, etc.) or network topology (ring, trunk, star, etc.).

A token passing logical ring network of the present invention distinguishes over prior networks by including at each station an Active Node Table (ANT) in which is stored a complete map of the logical ring, indicating the addresses of all the stations in the logical ring, and the sequence in which they pass the token. The following illustrative examples demonstrate the advantages afforded by the use of an Active Node Table at each station.

Figures 2A, 2B:
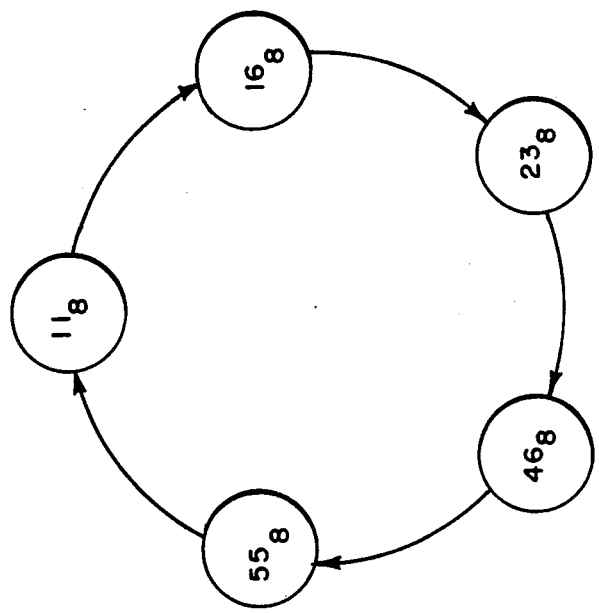
FIGS. 2a and 2b are schematic representations of an Active Node Table and the corresponding logical ring respectfully for an example logical ring communications network which employs the present invention.

Referring to FIG. 2b, an exemplary logical ring is formed containing five stations having the respective station addresses $11_8$, $16_8$, $23_8$, $46_8$, and $55_8$. Each address is expressed as a two digit octal number (base 8) where the first digit represents the high order 3 bits of the station address and the second digit represents the low order 3 bits. At any moment in time one of these stations is allowed to control the network and this station is said to possess the "token". If the station possessing the token sends a message that requires an immediate response from the destination, the destination station is given the opportunity to respond. After the response, the "right to send" then passes back to the station holding the token. The token holder must follow certain rules that regulate the amount of time that it may hold the token. When this time expires, or when the station has nothing further to send, the token holder may perform some network maintenance operations. When these are complete, the token holder passes the token to the next station in the logical ring. From the time the station passes the token until it again receives the token, the station will receive messages from other stations on the network who possess the token.

When it is time for a station to pass the token, the station refers to its Active Node Table to locate the next station in the logical ring. For example, in FIG. 2a there is shown the contents of an Active Node Table for this example network, an identical copy of which is stored in each station on the network. The Active Node Table is arranged in the form of a linked list, in which each table entry is a pointer to the next station in the logical ring. So for the network shown in FIG. 2a (with all addresses shown in base 8, Octal) the station with the lowest address is station $11_8$. The next higher address station is station $16_8$, and so the entry in the Active Node Table (FIG. 2a) at address $11_8$ is $16_8$. Similarly, the address in the Active Node Table at location $16_8$ is $23_8$, the address of the next station in the ring. Each subsequent location in the table in turn contains the address of its successor, in this example progressing to stations $46_8$, $55_8$, and then back to station $11_8$, closing the logical ring. The Active Node Table thus stores a complete map at each station of the addresses of all stations in the logical ring and the sequence in which the token is passed. For instance, if station $16_8$ is currently holding the token and desires to pass it, station $16_8$ would look up the address of its successor in its local Active Node Table, finding the address $23_8$. Station $16_8$ would then pass the token to station $23_8$. Similarly, when station $23_8$ is finished with the token it would find the address $46_8$ in its copy of the Active Node Table.

The foregoing discussion assumes that the Active Node Table is already in existance. The initialization of the Active Node Table and the continual updating thereof to accommodate changes in the network are also important aspects of this invention.

The maintenance of the Active Node Table at each station is accomplished as follows. First of all, it must be noted that while the representation of the logical ring is a serial loop, the actual, physical network hardware is such that all network traffic is always delivered to each and every station in the network. For example, if a bus type architecture is used for the network (FIG. 1), each station is physically connected in parallel with the bus, and receives all traffic on the bus. Each message packet is required to contain a source address indicating the station which is sending the packet and a destination address indicating the station for which the packet is intended. And so, the token pass message, although addressed to one particular station, is monitored by all other stations. This is the basic mechanism that each station uses to keep its Active Node Table current. Each station is continually monitoring the network. All stations are programmed to recognize a token pass message, even if it is not addressed to the monitoring station. The information obtained from monitoring all such token pass messages is used at each station to update its Active Node Table. For example, in the sample network of FIG. 2b, suppose that station $11_8$ passes the token to station $16_8$. All of the other stations in the network (e.g. stations $23_8$, $46_8$, and $55_8$) "hear" the token pass and therefore know that station $16_8$ is the next station in the logical ring after station $11_8$, and enter that information into their local copy of the Active Node Table. Of course, the station to which the token is addressed (station $16_8$ in this example) also makes the same entry in its Active Node Table, as does the station passing the token (station $11_8$). In this manner, each copy of the Active Node Table at the individual stations is kept identical.

Each station periodically obtains a "right to solicit" to check for new stations to be added to the network. Although there are many ways in which the solicitation can be performed, the procedure used in the embodiment described below is that described in U.S. patent application Ser. No. 771,834 to the assignee of the present invention the contents of which are herein incorporated by reference. When a station has the "right to solicit", addresses between that station and the next known successor station are queried one at a time with a "solicit successor" message. If a station exists at the address solicited and wants to join the network, it returns an "acknowledge" message, or "ACK". For example, in the network of FIG. 3b, suppose that station $23_8$ has the "right to solicit" and that station $32_8$ is waiting to join the network. Station $23_8$ begins by sending a "solicit successor" message to address $24_8$, the next higher address. When there is no response, as no station exists at that address, the next "solicit successor" message is sent to address $25_8$, and so on. Eventually, station $23_8$ solicits address $32_8$ and upon receiving the solicit successor message, station $32_8$ responds with an ACK. Station $23_8$ then knows that station $32_8$ is to be next in the logical ring and sends it the token. When that token pass occurs, all the other stations on the network are monitoring and hear the token pass from station $23_8$ to station $32_8$. All of the stations update their Active Node Tables (as shown in FIG. 3a) by writing the new successor address $32_8$ into location $23_8$, replacing the old successor address $46_8$.

The new station $32_8$ now has the token. While station $32_8$ was waiting to be solicited, it was monitoring the network and filling in its Active Node Table as each token pass occured. However, the new station may not have been monitoring long enough to complete the Active Node Table and so may not know which station is next in the logical ring. To take care of that eventuality, as a part of the "solicit successor" message format there is an information field which contains the address of the old successor, station $46_8$ in this example. Thus the new station, $32_8$, always knows at least which station to next pass the token to, even if its own Active Node Table is not yet complete. By the time the new station, $32_8$, gets the token again, the token will have traversed the entire logical ring and so the Active Node Table of the new station, $32_8$, will then be completed by monitoring each successive token pass.

Figures 3A, 3B:
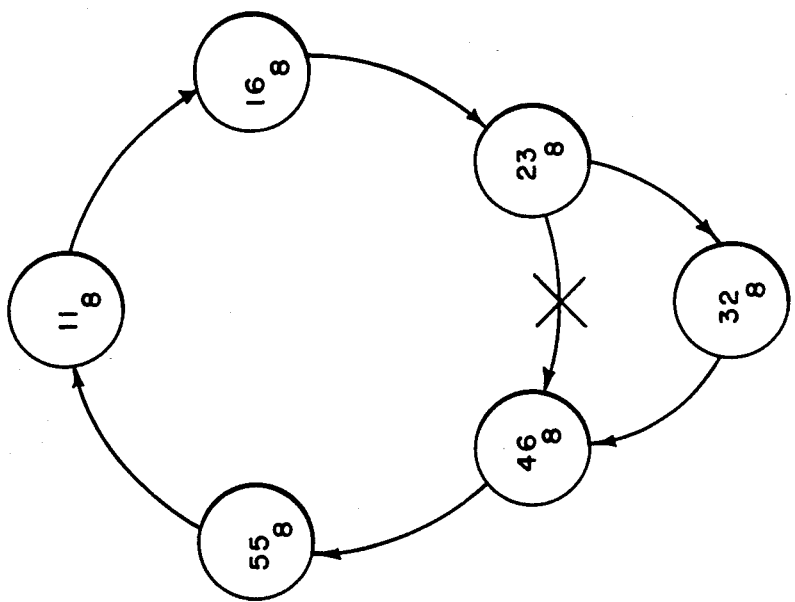
FIGS. 3a and 3b are schematic representations of an Active Node Table and the corresponding logical ring respectively showing the addition of a station to the logical ring of FIGS. 2a and 2b.

Back to the example in FIGS. 3a and 3b, when the newly added station $32_8$ is finished with the token, it passes the token to the station identified as the next successor in the "solicit successor" message, station $46_8$ in this example. Again, all of the stations on the network "hear" this token pass and enter the address $46_8$ at location $32_8$ in their Active Node Tables. This completes the sequence for adding a station to the network. The new station $32_8$ is patched into the Active Node Tables of every station on the network. A network of the present invention is particularly efficient in adding stations to the network because no additional message types other than "solicit successor" are needed; the Active Node Tables are updated automatically in the regular course of passing the token.

The initial configuration of the Active Node Table can now be explained. When a station is first powered up, it begins monitoring the network. At this time the Active Node Table for that station contains all null entries. A null entry is indicated by an entry containing a pointer to itself. If any activity is heard on the network (i.e. an existing network is running) the new station continues to monitor the network, filling in its Active Node Table as each token pass message is heard. Eventually, the station will be solicited and enter the network as described above.

However, in the case that a station is powered up and does not hear activity on the bus, a procedure is followed to claim the token. This would be the case, for example, if all stations are powered up at the same time or if the token is lost due to a station malfunction. The claim token procedure results in the station with the lowest address taking possession of a new token. Since the Active Node Table is empty, there is no station to pass the token to, and so the station that claims the token immediately begins to solicit other stations. When another station is found, it is given the token and the Active Node Tables of both stations are updated to reflect this two station network. The second station then solicits further stations, and new stations are added as described above, and so on. It is a particular advantage of this invention that no special procedures are required to build the initial network; once the token is claimed, the network is built initially by the same network maintenance functions which are always operating on the network (e.g. solicit, add stations).

A network of the present invention also has the ability for dropping one or more stations from the network, including multiple sequential stations without disruption of the network. The ability to cope with multiple sequential station exits without network disruption is significant because this feature is beyond the capability of prior networks, which only store predecessor and successor information at each station.

Figures 4A, 4B:
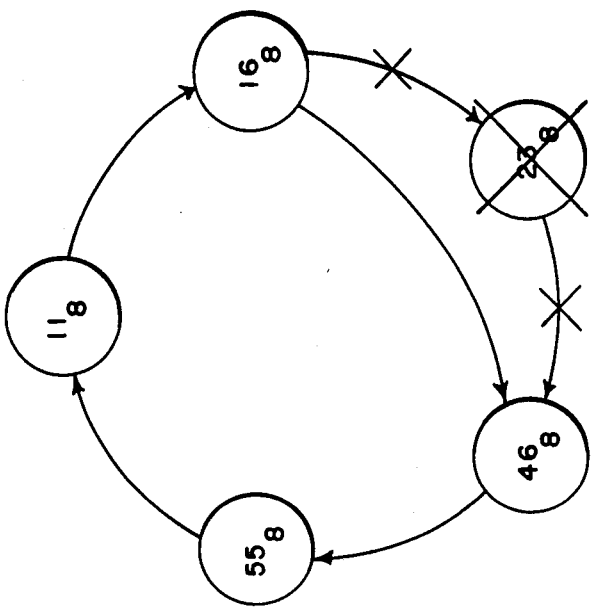
FIGS. 4a and 4b are schematic representations of an Active Node Table and the corresponding logical ring showing the removal of a station from the logical ring of FIGS. 2a and 2b.

A station may fail to accept the token for several reasons, for example being switched off-line, losing power, or developing a fault. If a station fails to accept the token, the station attempting to pass the token will retry the token pass a fixed, limited number of times. If there is still no response after all of the retries have been taken, the station with the token presumes that the non-responding station is disabled. For example, referring to FIGS. 4a and 4b, suppose that station $16_8$ has the token and has exhausted all of the retries in attempting to pass the token to station $23_8$. Station $16_8$ then assumes that station $23_8$ is out of the logical ring. Station $16_8$ then refers to its Active Node Table to find the next station after the failed station $23_8$. In this example that next station is station $46_8$. Station $16_8$ then passes the token to station $46_8$ and, upon hearing that token pass, all stations update their Active Node Tables to reflect the new network configuration. As shown in the Active Node Table of FIG. 4a, the next node for station $16_8$ is changed from $23_8$ to $46_8$ and the old pointer for station $23_8$ is erased.

Because each Active Node Table stores a map of the entire network, multiple station failures are easily tolerated. Suppose that in the previous example that station $46_8$ also did not accept the token. In that case the station with the token (station $16_8$) would go back to its Active Node Table to find the next possible station to pass the token to. This iterative process could be carried out until all stations but the token holder have been eliminated from the network, in which case the network would be re-initialized by soliciting as described above.

There are two other benefits afforded by the use of Active Node Tables at each station. First, because each station automatically knows which other stations are actually on the network at any given instant, it is possible to form an Active Node Status Word indicating the active stations. The Active Node Status Word can then be used by high level processes within each station to make decisions based on the availability of resources on the network.

Secondly, since all stations monitor and decode all token pass messages to update their Active Node Tables, it is possible to include valid data in the information field of a token pass message. The data in the token pass message can then be used for some predefined purpose, such as broadcasting status, or as in the embodiment described below, dedicated I/O data referred to herein as Virtual I/O data.

DESCRIPTION OF THE PREFERRED EMBODIMENT

Referring to FIG. 1, a network of the present invention is an improved type of token passing logical ring network. To implement such a network it is necessary to have all of the stations in the logical ring connected to a shared communications media of the broadcast type. On a broadcast media, every station receives all messages transmitted. While there are several possible topologies and types of media well known in the art, this embodiment is based on a physical bus 1. The bus 1 is used to interconnect various industrial control equipments 4, 5, 6, 7, and 8. This situation could be typical for example, in a manufacturing cell environment, where several separate but related processes are carried on at once and must be coordinated among the corresponding controllers. To perform such coordinated tasks, the systems on the bus 1 must communicate in a peer-to-peer fashion. A network of the present invention which provides that communication is therefore referred to herein as a Peer Communications Link (PCL) Network.

Each of the industrial control equipments 4, 5, 6, 7, and 8 are connected to the bus 1 through taps 3 and dropline cables 9. Each system 4, 5, 6, 7, and 8 therefore is a node, or station, on the network with each station being assigned a unique station address to identify that station for message routing purposes.

The bus 1 is a cabling system which conveys information in the form of electrical signals. The cabling system employs 75 ohm flexible coaxial cable with a double shield (foil/braid) to maintain high noise immunity. BNC connectors are employed to connect the cable segments together.

Still referring to FIG. 1, the bus 1 is comprised of segments 10 of RG-11 type cable connected together by taps 3. The bus 1 is terminated at each end with a 75 ohm passive termination 2. The taps 3 provide a means for connecting the stations to the bus 1 through a dropline cable 9. The dropline cables 9 also employ a 75 ohm coaxial cable, and each has a length of approximately twenty four inches. Because of the short length, a more flexible and easy to install cable may be used for the dropline cables 9. The signaling format used on the bus 1 is the industry standard Synchronous Data Link Control (SDLC) format with a signaling rate of 57.6 Kilobaud. It should be apparent to one skilled in the art that many other signalling formats and rate could be used in practicing this invention.

Intelligent programming terminal 4 is connected to the bus 1, and provides for operator access to any of the systems connected on the bus 1. The intelligent programming terminal can up-load, down-load, and edit the data and programs for the controllers 5, 6, and 7 connected to the bus.

A gateway 8 to other networks provides the capability for communication outside of this local network. The other networks (not shown) to which the gateway 8 provides access may be other PCL networks, or may be networks utilizing completely different protocols. In the latter case, the gateway B provides any necessary translation for intercommunications between the networks.

The remaining equipment on the bus 1, namely the programmable controller 5, numerical controller 6, and process control computer 7, represent a typical configuration as might be found in a manufacturing cell environment. Each of the controllers 5, 6, and 7 are programmed to interact with one another to achieve some overall function in a coordinated manner. The communications required to achieve that coordination are provided by token passing logical ring of the present invention.

Figure 5:
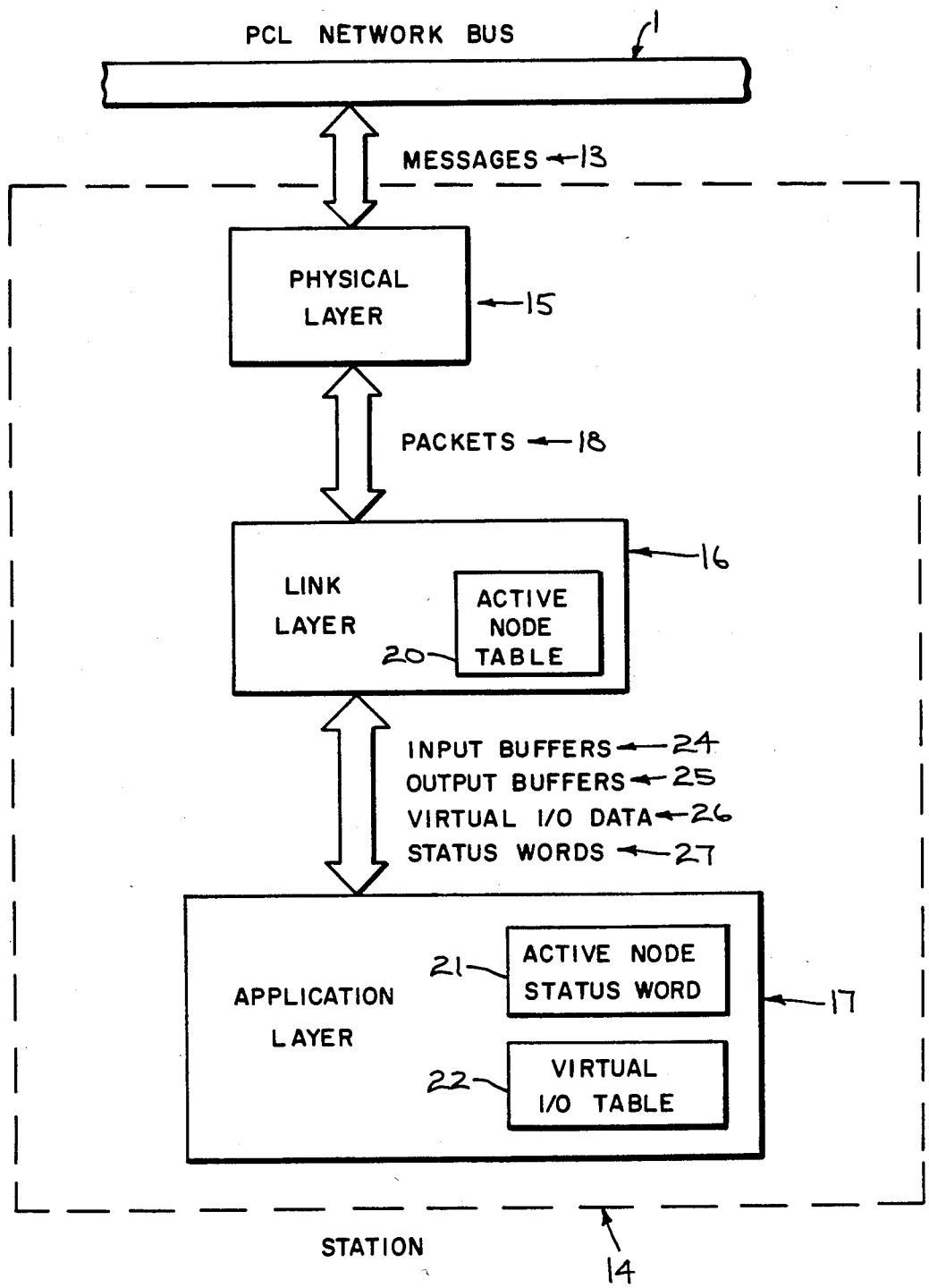
FIG. 5 is a logical representation of the protocol layers in a station which employs the present invention.

Referring to FIG. 5, each station 14 in a network of the present invention can be logically represented in terms of the protocol layers 15, 16, and 17 used to implement the token passing logical ring. These layers are the physical layer 15, the link layer 16, and the application layer 17. The layers 15, 16, and 17 generally are based on the corresponding layers 1, 2, and 7 (not shown) of the International Standards Organization (ISO) seven layer reference model for Open Systems Interconnection (OSI). While layers 3 through 6 of the ISO model representing the network, transport, session, and presentation layers are not included in this embodiment, their inclusion would be obvious to one of ordinary skill in the art. In this embodiment, any necessary functions which would normally be performed by layers 3 through 6 of the ISO model are instead performed by the link layer and application layer as described below.

The physical layer 15 performs the actual transmission and reception of messages 13 onto the PCL network bus 1. The physical layer 15 converts the messages from the PCL network bus 1 to packets 18 of information and vise versa by appending or stripping certain formating characters as described below. The packets 18 are exchanged between the physical layer 15 and the link layer 16. It is the link layer 16 which implements the token passing logical ring of the present invention. The link layer 16 performs all of the automatic network maintenance functions such as claiming the token, passing the token, soliciting a successor, and sending acknowledgements. The link layer 16 also maintains the Active Node Table 20 by monitoring token passes on the network as described in the general description of the invention above. The application layer 17 is the highest level protocol layer which represents the main processing being performed at the station 14. The link layer 16 represents an access service to the token passing logical ring for use by the application layer 17. Communications between the link layer 16 and the application layer 17 are by means of input buffers 24, output buffers 25, virtual I/O data 26, and status words 27 as described in detail below. One specific status word sent from the link layer 16 to the application layer 17 is the Active Node Status Word (ANSW) 21.

The ANSW 21 contains one bit for each possible address on the network. The link layer 16 generates the ANSW 21 by setting those bits which correspond to the addresses of the stations active in the logical ring as indicated in the Active Node Table 20. The application layer 17 is thus automatically appraised of the on-line status of each station on the network through the ANSW 21. In prior networks, it would have been necessary to transmit a series of high level messages between application layers of the stations to acquire such information.

A Virtual I/O Table 22 in the application layer 17 is kept continually updated by the link layer 16. The link layer 16, as described in detail below, receives and processes all token pass messages on the network in order to maintain the Active Node Table 20. Because the token pass messages are received and processed at all stations, it is possible with a network of this invention to include data in the token pass message. In this embodiment, the data field in the token pass message is used to contain Virtual I/O data 26. The Virtual I/O data is generated by each station to indicate information about the generating station. The exact definition of each bit of Virtual I/O data 26 is determined by the application layer 17. As an example, one bit of Virtual I/O data 26 may mean that a process being performed by the station which generated that bit has been completed. Another bit of Virtual I/O data 26 may be used to request a process to be performed by another station, or to indicate some status such as being out of materials or a fault. The Virtual I/O data 26 thus does not originate from the physical I/O customarily associated with industrial controllers and so is kept in a separate Virtual I/O Table 22. It is that Virtual I/O Table 22 which is kept continually updated by a network of this invention automatically and without the need for any high level messages from the application layer 17.

Figure 6:
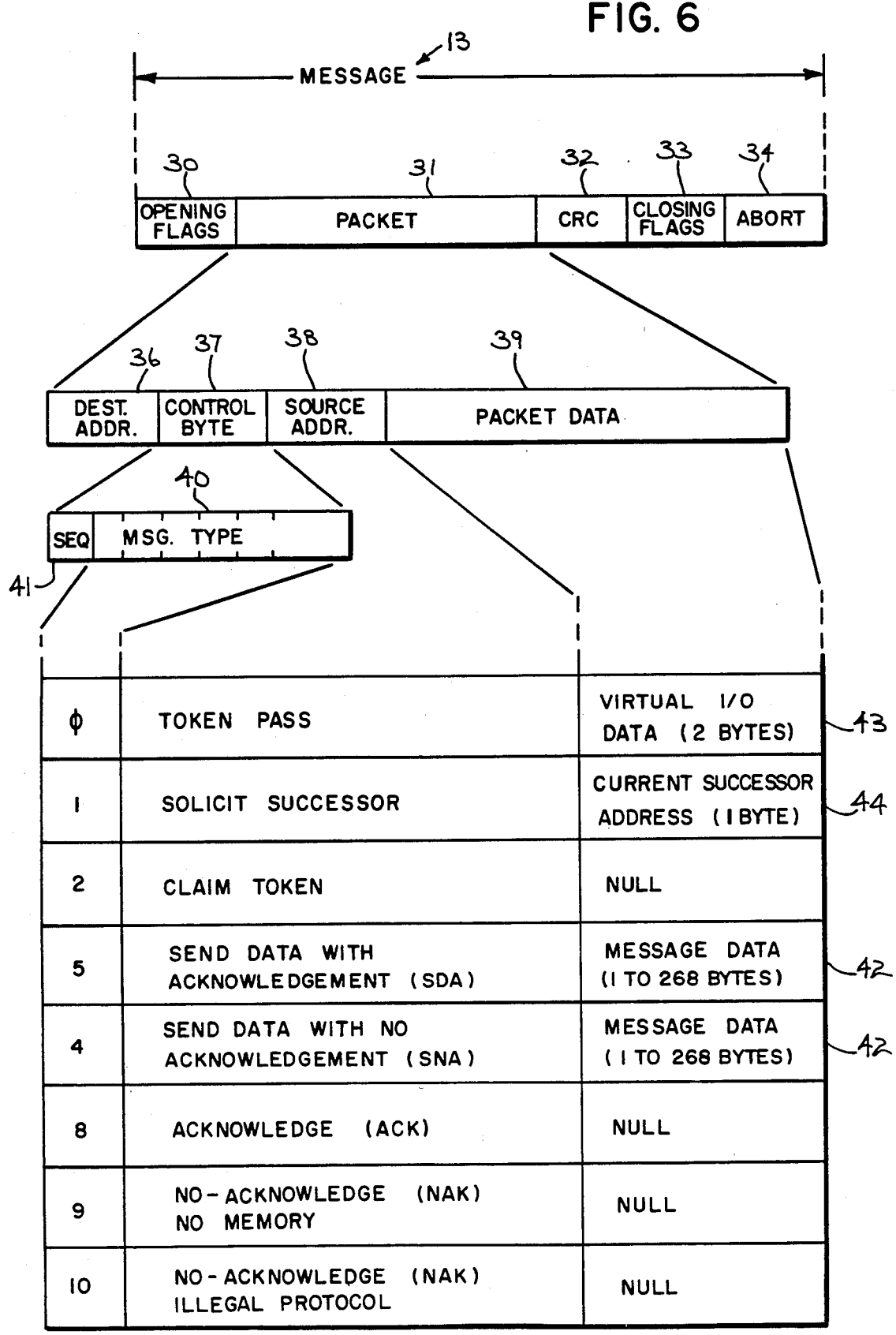
FIG. 6 is a schematic representation of the structure of the messages which are sent on the network of the present invention.

Referring to FIG. 6, the messages 13 which are conveyed over the PCL network bus 1 are comprised of a series of ones and zeros which implement a bit-oriented protocol. The protocol used in this embodiment is the industry standard Synchronous Data Link Control (SDLC) format. A serial Communications Controller (SCC) type Z8030 maufactured by Zilog, Inc. is used to implement the SDLC protocol as described in the hardware description below. A complete message 13, or frame, includes opening flags 30, a packet 31, Cyclical Redundancy Check (CRC) characters 32, closing flags 33, and an abort character 34. The packet 31 is exchanged between the link layer 16 and the physical layer 15. The opening flags 30, CRC characters 32, closing flags 33, and abort character 34 are used only by the physical layer 15. They are appended to the packet 31 for transmission and stripped from the packet 31 upon reception automatically by the SCC. The opening flags 30 (three bytes long) allow the receiver to synchronize to the incoming data stream while the closing flags 33 (one byte) and abort character 34 (one byte) are used to detect the end of the message 13. The CRC characters 32 (two bytes) provide an error check on the message 13 as is well known in the art.

Each packet 31 includes four segments: a destination address 36; a control byte 37; a source address 38; and packet data 39. The destination address 36 is one byte in length and it indicates the station address of the message destination. A destination address 36 of "255" indicates that the message is "broadcast" to all stations. Similarly, the source address byte 38 indicates the address of the station which originated the message. The control byte 37 includes seven bits which identify the nature, or "type" 40, of message. A single bit 41 (SEQ) which is part of the control byte 37 is employed as a toggle to detect duplicate messages.

There are eight message types indicated by the control byte 37:

0=token pass message which is employed to pass the token and to broadcast Virtual I/O Data.
1=solicit successor (SOS) message which is employed to locate a station which is waiting to join the logical ring.
2=claim token message used to establish ownership of the token during network initialization or if the token is lost.
5=Send Data with Acknowledgement (SDA) message which delivers data to the destination address and requests a response of either an acknowledgement (ACK) message to confirm an error free delivery or a No-acknowledge (NAK) message indicating an error in message reception.
4=Send Data with No Acknowledgement (SDN) message which delivers data to the destination address without requesting a response.
8=Acknowledge (ACK) message indicating the error free reception of a preceding SDA message.
9=No Acknowledge (NAK) - No memory, which indicates that the preceeding SDA message was not accepted due to the unavailability of an input buffer.
10=to Acknowledge (NAK) - Illegal Protocol, which indicates that the preceeding SDA message violated the maximum length limit.

It is a particular advantage of this invention that only two types of messages are needed for normal network maintenance, namely token pass (type 0) and Solicit Successor (type 1). Prior Networks required a multitude of additional message types such as "who's next?", "I'm next", "Load your predecessor", and "Load your successor". The Active Node Table of the present invention eliminates the need for such multiple message types thus simplifying network operation.

Referring again to FIG. 6, the packet data field 39 varies in both content and length depending on the type of the message. For claim token (type 2), ACK (type 5), NAK - No memory (type 6) and NAK - illegal protocol (type 7) messages, the packet data field 39 is null (i.e. zero length). For SDA and SDN messages (types 3 and 4, respectively) the packet data field 39 contains actual message data 42. The message data 42 is the specific information to be communicated to the recipient station. The format of the message data 42 is determined by the communicating application layers. An arbitrary maximum length of 268 bytes is enforced for the message data 42 in this embodiment of the invention to limit the amount of time that any one station holds the token.

In a token pass message (type 0) the packet data field 39 contains 2 bytes of Virtual I/O data 43. The inclusion of the Virtual I/O data 43 in the token pass message allows the maintenance of Virtual I/O Tables at each station without the need for high level message traffic.

Finally, in a solicit successor (SOS) message (type 1) the packet data field 39 contains a one byte value 44 which is the address of the current successor for the station sending the SOS message. This current successor address 44 is used by the station being solicited to indicate to it the next station to get the token after the solicited station joins the logical ring.

Referring back to FIG. 1, as mentioned above, each system 4, 5, 6, 7, and 8 in the PCL network of the present invention interfaces to the bus 1. Each station 4, 5, 6, 7, and 8 has a compatable physical interface to the bus 1, but more importantly must also implement the protocol of the present invention. Since each station 4, 5, 6, 7, and 8 has a common protocol implementation, the description below of the present invention as applied to the programmable controller 5 also applies to any of the other stations. A network of the present invention can be formed either from as few as two of the programmable controllers 5 or from a mix of any number of controllers of different types.

Hardware Description

The programmable controller 5 is that which is described in co-pending U.S. patent application, Ser. No. 717,221 to the assignee of the present invention, the contents of which are herein incorporated by reference.

Figure 7:
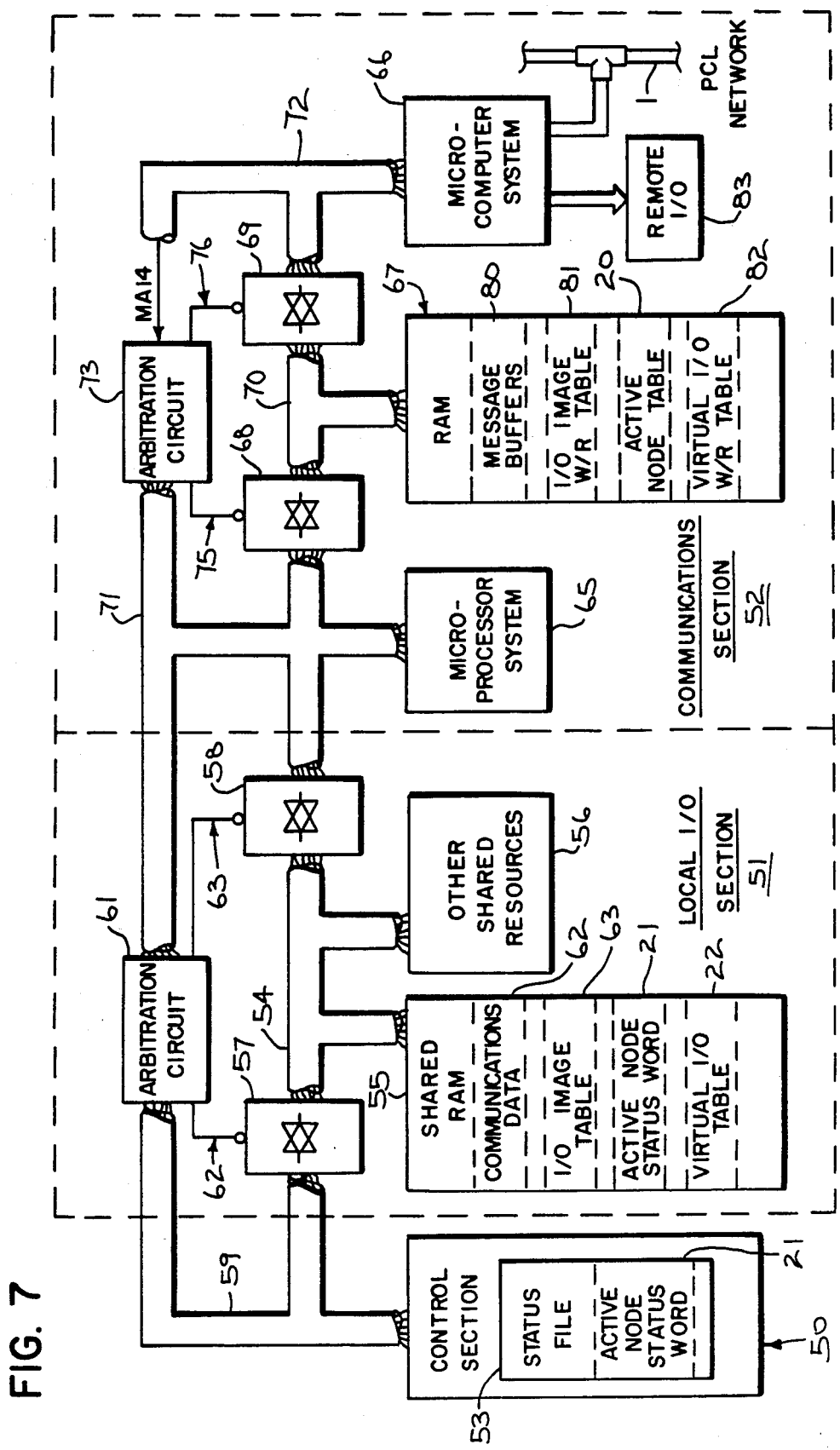
FIG. 7 is a block diagram of a programmable controller which employs the present invention.

Referring to FIG. 7 the programmable controller includes three main sections: a control section 50, a local I/O section 51, and a communication section 52. The control section 50 performs the main processing for the programmable controller 5, including execution of a user control program (not shown). Also included in the control section 50, are several data files (not shown), and a status file 53 for use in executing the user control program (not shown). The status file 53 includes the Active Node Status Word 21, indicating which nodes are currently active in the logical ring. The structure and maintenance on this Active Node Status Word 21 will be discussed in greater detail below.

The communication section 52 contains two computing systems designated herein as a microprocesser system 65 and a microcomputer system 66. The microprocesser system 65 is based on a Z-80 microprocessor manufactured by Zilog, Inc., while the microcomputer system is based on a Z8 Microcontroller also manufactured by Zilog, Inc. The two systems 65 and 66 share a common ram 67 through a pair of tranceivers 68 and 69. The transceiver 68 provides for connection of a ram bus 70 to a microprocessor system bus 71, while the other transceiver 69 provides for connection of the ram bus 70 to a microcomputer system bus 72. An arbitration circuit 73 also connected to the respective system buses 71 and 72 provides enabling signals 75 and 76 to the two transceivers 68 and 69 to establish the appropriate connection. The ram 67 is thus assessable to both the microprocessor system 65 and the microcomputer system 66 and contains message buffers 80, an I/O image W/R table 81, the Active Node Table 20, and the Virtual I/O W/R table which are used in the communications operations of this section. The mircocomputer system 66 is a dedicated processor which has as its sole function the transmission and reception of data to and from I/O links. The microcomputer system 66 connects to a PCL Network bus 1 of the present invention, and can also service a remote I/O link 82 to external I/O racks (not shown).

The local I/O section 51 is configured around a shared bus 54 which provides access to a shared ram 55 and other shared resources 56 to either the control section 50 or the communication section 52. The shared ram 55 includes a communications data area 62, an I/O Image Table 63, the Active Node Status Word 21, and the Virtual I/O Table 22. The I/O Image W/R Table 81 and the Virtual I/O W/R Table 82 in the RAM 67 are write/read working tables which are used for I/O operations and are periodically updated from the corresponding I/O image table 63 and Virtual I/O Table 22 in the shared RAM 55.

The other shared resources 56 include various inputs and outputs (not shown) plus an interface to a local I/O rack backplane (not shown). A detailed description of these other shared resources 56 is contained in the copending U.S. patent application, Ser. No. 717,221 to the assignee of the present invention, the contents of which are herein incorporated by reference.

The shared bus connects to two sets of tranceivers 57 and 58 for interface to a control section system bus 59 and the microprocessor system bus 71 of the communication section 52, respectively. An arbitration circuit 61 resolves contention for the shared bus 55 by monitoring the control system bus 59 and the mircroprocesser system bus 71 and generating the appropriate enabling signals 62 and 63 for the two tranceivers 57 and 58, respectively.

The general operation of the programmable controller 5 can now be described. The microcomputer system 66 provides the lowest level communications function to the PCL Network. The functions performed by the microcomputer system 66 represent the physical and link layers (FIGS. 5, 15 and 16) of the network. As such, the microcomputer system 66 performs all the necessary network maintenance functions including updating of the Active Node Table 20 and the Virtual I/O W/R Table in the ram 67. These network maintenance functions are performed automatically by the microcomputer system 66, and are thus completely transparent to the other processors in the programmable controller 5. In addition to the network maintenance functions, the microcomputer system 66 also provides for the reception and transmission of messages on the PCL Network. The flow of events for the reception of the messages is as follows. For an incoming message, the microcomputer system 66 receives each byte of the message one by one and assembles the bytes in an input buffer in the message buffer 80 area of the common ram 67. When the message is complete, a flag (not shown) in the ram 67 is set to signal the microprocessor system 65 of the completion of the message. The microprocessor system 65 then moves the completed message into the communications data area 62 of the shared ram 55, and sets another flag (not shown) in the shared ram 55 indicating the arrival of the message to the control section 50. The control section 50 interrogates the incoming message flags every 10 milliseconds as a part of the periodic 10 millisecond interupt service routine. When the incoming message flag is so detected, the control section reads the message from the communications data area 62 in the shared ram 55, and may then process the message as required.

Similarly, when the control section 50 has a need to transmit a message onto the PCL Network, the control section 50 generates a formated packet 31 to be sent and places it in the communication data area 62 of the shared ram 55. The control section 50 then interrupts the microprocessor system 65 of the communications section 52 to indicate the presence of the output packet 31. The microprocessor system 65 then transfers the output packet 31 to the message buffer 80 of the ram 67, and sets an output flag (not shown) indicating that a message is waiting for transmission. When the microcomputer system 66 next acquires the token as a part of its normal network operations, the microcomputer system 66 interrogates the output flag to see if there are any messages waiting for transmission. If the output flag is set then the microcomputer system 66 proceeds to transmit the output message onto the PCL Network.

As mentioned above, the microcomputer system 66 maintains the Active Node Table 20 and a virtual I/O W/R Table 82 in the ram 67. The Active Node Table 20 is a complete map of all the stations in the logical ring and the sequence in which they pass the token. The Active Node Table 20 is used by the mircocomputer system 66 for network maintenance purposes. It is a important aspect of this invention that the information in the Active Node Table 20 indicating which stations are currently in the logical ring is made available to the high level processing functions in the control section 50 without the need for explicitly transmitting high level messages. To accomplish this, the microprocessor system 65 periodically, at one second intervals reads the Active Node Table 20 in the ram 67 and prepares the Active Node Status Word 21. The Active Node Status Word 21 is 64 bits long with each bit corresponding to a respective station address on the PCL Network. The PCL Network in this embodiment is limited to 64 stations with the respective station addresses of 0 to 63. Station address 255 is reserved for broadcast messages. Each bit of the Active Node Status Word 21 therefore corresponds to a station address on the PCL Network, and the value of that bit indicates the actual presence of an active station at that address in the logical ring. A logic value of one indicates that a station is present in the logical ring at that address and a logic value of 0 indicates that there is not a station present in the logical ring at that address. Once the microprocessor system has prepared the Active Node Status Word 21, it is placed in the shared ram 55 and a flag (not shown) is set to indicate to the control section 50 the presence of an updated Active Node Status Word 21. The control section 50 takes the Active Node Status Word 21 from the shared ram 55 and places it in the users status file 53, which is a part of the users data table (not shown). The Active Node Status Word 21 is therefore available to the program in the control section 50 to indicate which stations are available on the logical ring, without the need for the control section 50 to interrogate via high level query messages.

Figure 8:
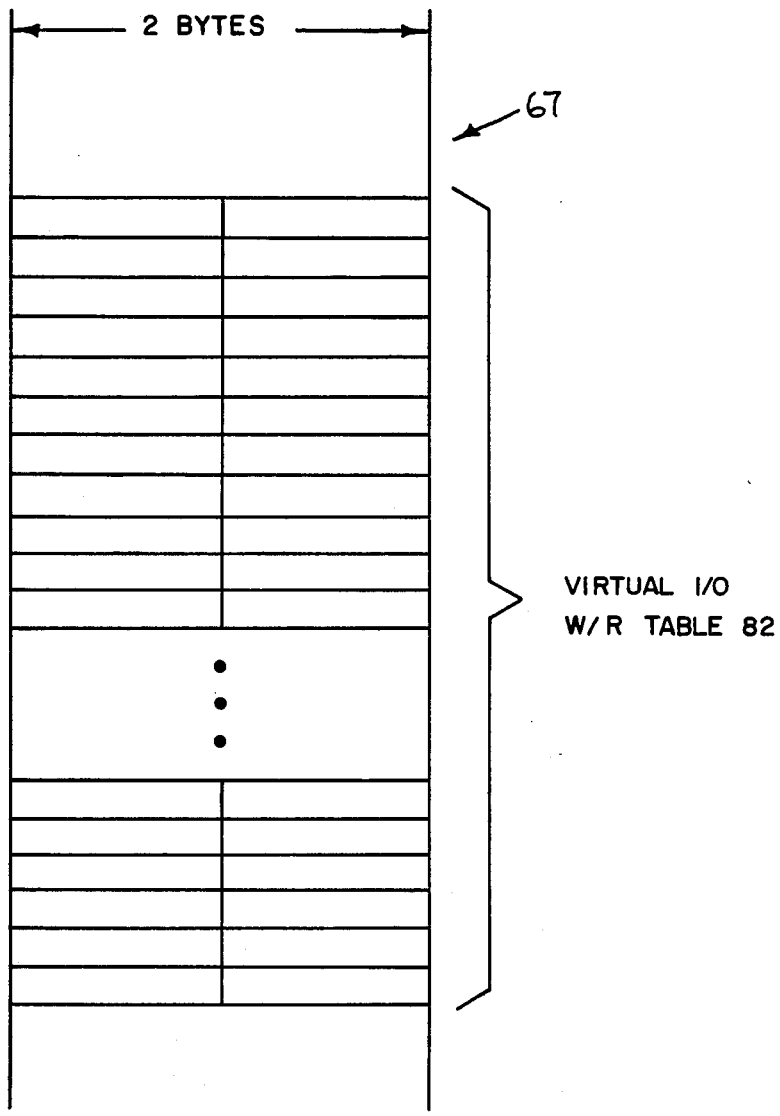
FIG. 8 is a map of the virtual I/O W/R Table which is stored in a memory that forms part of the programmable controller of FIG. 7.

Referring to FIGS. 7 and 8 the microcomputer system 66 also maintains the Virtual I/O W/R Table in the ram 67. The Virtual I/O terminology is used to describe input and output information for which there are no actual corresponding physical input and output devices. Instead, Virtual I/O data is that data which is generated by stations on the PCL Network in order to communicate with other peer stations. The Virtual I/O facility thus provided by this invention is a mechanism by which controllers on the PCL Network can communicate data in a peer-to-peer fashion automatically without the need for high level messages. The meaning of the bits passed in the Virtual I/O data are application dependent and not defined by the PCL network. The PCL Network simply provides a facility for communicating the I/O data to other controllers on the Network. The Virtual I/O W/R Table 82 consists of 128 bytes of memory in the ram 67, two bytes corresponding to each possible station address on the PCL Network. The Virtual I/O data is transmitted as a part of each token pass message as described in detail below. As each token pass is monitored by the microcomputer system 66 the Virtual I/O Data 43 from the packet data field 39 of the token pass message is used to update the two byte field in the Virtual I/O W/R Table corresponding to the address of the source 36 of the token pass message. The Virtual I/O W/R Table is thereby continually updated with the most current data from all of the other processors on the PCL Network.

The Virtual I/O W/R Table is processed by the microprocesser system 65 in a manner similar to the I/O image W/R table for physical I/O. On every complete scan of the user program, the I/O Image Table 63 and the Virtual I/O Table 22 in the shared ram 55 are updated with the contents of the I/O Image W/R table and the Virtual I/O W/R Table 82 in the ram 67, respectively. The microprocessor system 65 of the communications section 52 performs this update on command by the control section 50. During this update process, the virtual I/O table 22 is updated with the most current input data from the virtual I/O W/R Table 82 and the Virtual I/O W/R Table 82 is updated with the most current Virtual I/O output data from the Virtual I/O Table 22. When the microcomputer system 66 is about to pass the token, the Virtual I/O output data corresponding to the address of this station in the Virtual I/O W/R Table 82 is extracted from the ram 67 and formatted into the packet data field 39 of the token pass message. When that token pass message is sent out, all of the other stations on the PCL Network will receive the Virtual I/O output data from this station.

Figure 9:
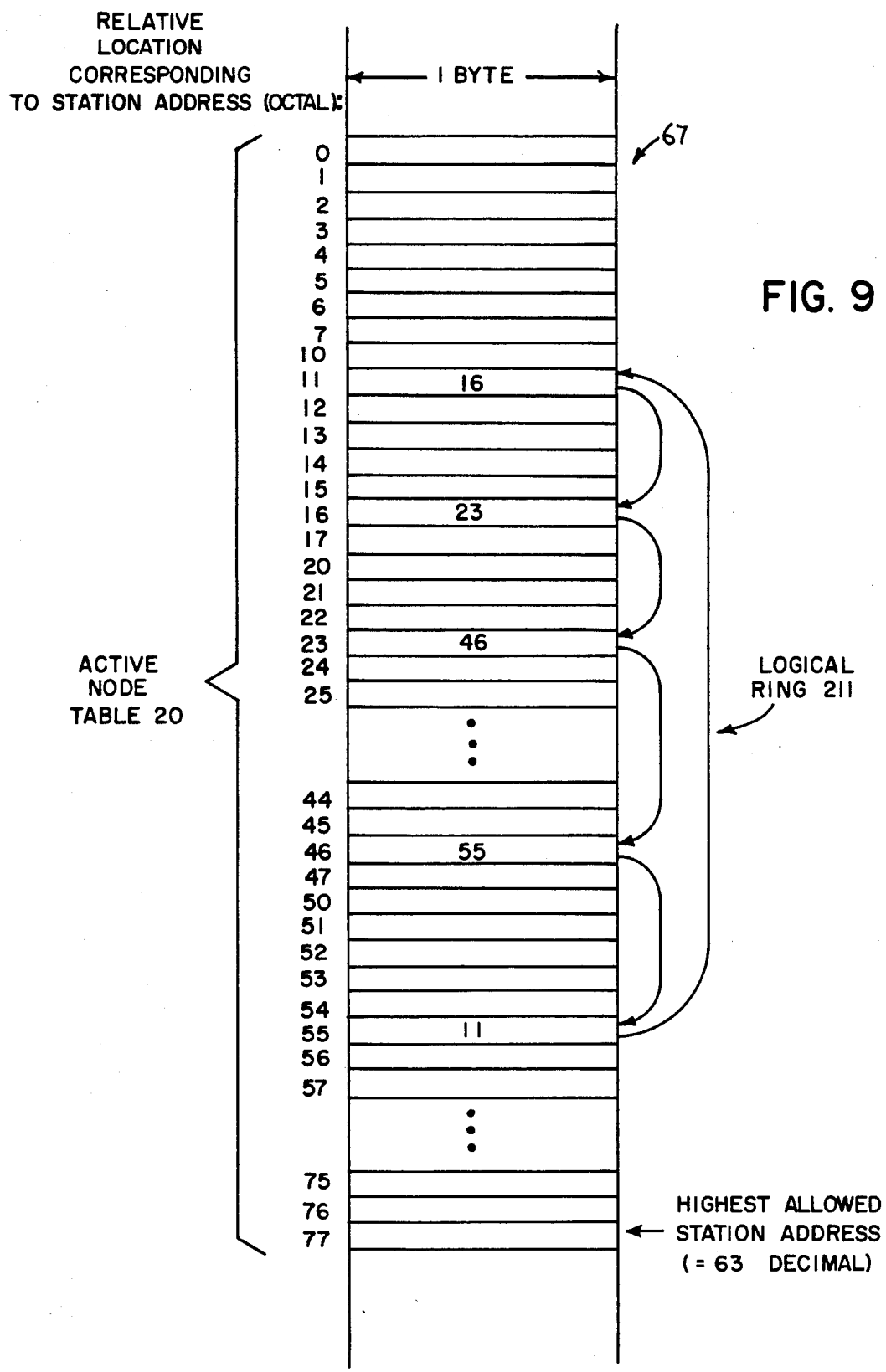
FIG. 9 is a map of the Active Node Table which is stored in a memory that forms part of the programmable controller of FIG. 7.

Referring to FIGS. 7 and 9, the Active Node Table 20 consists of 64 bytes of memory with the address of each byte corresponding to a station address in the logical ring. The contents of each byte is a pointer to the next station address in the logical ring. The Active Node Table of FIG. 9 is filled in with the station address from the example network of FIGS. 2a and 2b for illustrative purposes.

Figure 10:
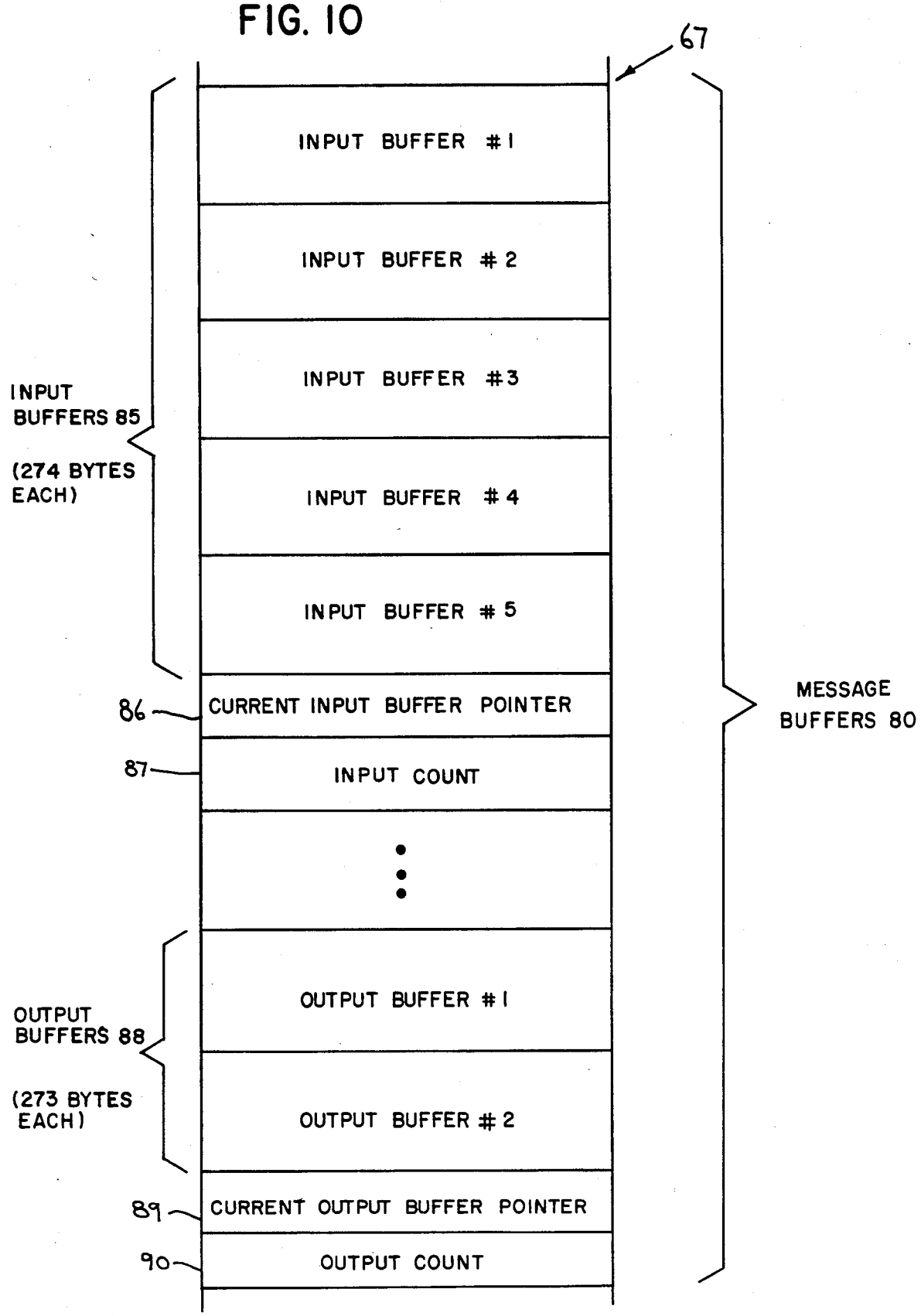
FIG. 10 is a map of the message buffers which are stored in a memory that forms part of the programmable controller of FIG. 7.

Referring to FIGS. 7 and 10, the message buffer area 80 includes:

A. A set of five input buffers 85, each of which is 274 bytes long to be able to contain a maximum length message of 272 bytes plus a two byte message length field. A maximum length message is a data message with 268 bytes of message data 42; destination, control, and source bytes 36, 37, and 38, respectively; and one of the CRC bytes 32 for a total of 272 bytes. It is necessary to buffer one CRC byte because when the first CRC byte is received it is not known to be a CRC byte. The first CRC byte is treated as data until the closing flags 33 are detected. Then the previous 2 bytes are known to have been the CRC bytes 32. Thus the first CRC byte is buffered like a data byte and then discarded after the message is complete.

B. A current input buffer pointer 86 which points to the next available input buffer 85.

C. An input count 87, which stores the number of input buffers 85 available. The input count 87 is initially "5" and is decremented each time an input buffer 85 is used for an incoming message and incremented when an input message is moved out of an input buffer 85.

D. A set of two output buffers 88, each of which is 273 bytes long. Again, two bytes of the buffer are used to contain the message length. The maximum length for an output message is 271 bytes; 268 bytes of message data 42; and destination, control, and source bytes 36, 37, and 38, respectively.

E. A current output buffer pointer 89 which points to the next available output buffer 88.

F. An output count 90, which indicates the number of output buffers which contain a valid output packet 31 waiting for transmission.

The useage of these variables in the message buffer area 80 is described in detail in the Software Description below.

Referring to FIG. 11, the microcomputer system 66 is based on a Z-8 microcomputer 100 which connects to a control bus 101, a combined address and data bus 102, and a high order address bus 103. The three buses 101, 102, and 103 together form the microcomputer system bus 72. The combined address and data bus 102 is multiplexed between either the low order eight bits of address or eight bits of data. The high order address bus 103 contains the high order eight bits of address. An address latch 104 is used to latch the low order eight bits of address based on an address strobe signal 105 from the control bus 101. The latched low order eight bits of address are combined with the high order eight bits of address to form the address bus IO6 containing all 16 bits of address MA0-MA15. The microcomputer 100 contains an internal RAM 108 for temporary storage of various I/O parameters described in detail below.

The microcomputer 100 also interfaces to a set of six node address switches 107 by means of six discrete inputs on the microcomputer 100. The node address switches 107 are used to set the address that will be used by this station on the PCL Network.

The microcomputer system 66 includes a Serial Communications Controller (SCC) 110 which in this embodiment is a model no. Z8030 manufactured by Zilog, Inc. The primary interface between the microcomputer 100 and the SCC 110 is the combined address/data bus 102. The SCC 110 contains 32 internal eight bit registers (not shown), 16 for read and 16 for write, which are used for data, command, and status information.

Through the combined address/data bus 102 the microcomputer can read and write to any of these internal SCC registers. The address line MA15 111 is used as a chip select input to the SCC 110, and so no other address decoding is necessary. The write control line 112 from the control bus 101 is input to the SCC 110 to determine the direction of data transfer (read or write) on the combined address/data bus 102 during data transactions. In operation, whenever the SCC 110 has received a byte of input from the network, transmitted a byte of output, or has detected an error condition requiring attention, the SCC 110 signals the microcomputer on an interrupt request line 113. The microcomputer 100 responds by acknowledging the interrupt through the use of an SCC interrupt logic circuit 115 which is described in detail below. The SCC interrupt logic circuit 115 generates a gated address strobe signal 116, a gated data strobe signal 117 and an interrupt acknowledge signal 118 to the SCC 110. These signals 116, 117, and 118 are coordinated in such a manner as to result in the acknowledgement of the interrupt and the receipt of an interrupt vector over the combined address/data bus 102 in the microcomputer 100. The interrupt vector directs the microcomputer 100 to an appropriate interrupt processing routine to service the condition in the SCC 110 that precipitated the interrupt request. For a detailed description of the operation of both the microcomputer 100 and SCC 110, reference is made to the "Zilog Microcomputer Components Data Book" published by Zilog, Inc. the contents of which are herein incorporated by reference.

Referring to FIGS. 6 and 11, the function of the SCC 110 is to implement the industry standard Synchronous Data Link Control (SDLC) protocol. The SDLC protocol has been described above in connection with the message format. The tasks performed by the SCC 110 in implementing the SDLC protocol are:

a. The generation of the opening flags 30 to be prefixed on a packet 31 for transmission, and the recognition of the opening flags 30 of an incoming message;

b. The calculation of a cyclical redundancy check (CRC) on a packet 31 for transmission and appending the CRC characters 32 onto the end of the packet 31 during transmission, and the calculation of a CRC on an incoming packet 31 and checking that calculated CRC against the CRC characters 32 received in the incoming message to verify the integrity of the incoming message; and, c. Appending closing flags 33 and an abort character 34 onto the end of a message for transmission, and the recognition of the closing flags 33 on an incoming message.

Referring again to FIG. 11, the SCC 110 converts the parallel byte wide data exchanged between the SCC 110 and the microcomputer 100 into serial data for transmission and reception over the PCL network. The transmission of data is performed by a Manchester encoder and driver 121, the operation of which is well known in the art. The request to send output 122 of the SCC 110 serves as the TX enable signal 123 into the Manchester encoder 121 to turn on the internal transmitter (not shown). The Manchester encoder 121 receives the necessary clock signals 128 from a clock generator 124 which also operates in well known fashion. The clock generator 124 also generates an XMT clock input 125 for the SCC 110 to control the serial output of bits on the XMIT data line 126. The output of the Manchester encoder and driver 121 is coupled via a transformer 127 onto the PCL network bus 1.

Similarly, signals received on the PCL network bus 1 are coupled by the transformer 127 into a Manchester receiver and decoder 128 which operates in well known fashion to extract a receive clock signal 129 from the incoming data stream as well as decoding a received data signal 130. The Manchester receiver and decoder 128 receives clock signals 128 from the clock generator 124 for its operation. The receive data 129 and receive clock 130 signals from the Manchester receiver and decoder 128 are input into the SCC 110, where they are converted back into parallel format for transmission to the microcomputer 100.

Referring to FIGS. 11 and 12, the function of the SCC interrupt logic circuit 115 is to overcome a problem inherent in inputting an interrupt vector from the SCC 110. The problem is that the interrupt vector from the SCC 110 does not become valid until after the regular data strobe from the microcomputer 100 has already passed, and that the microcomputer 100 has no means on its own of stretching the data input cycle. The SCC interrupt logic circuit 115 operates to provide a longer data input cycle during interrupt acknowledge operations to allow the interrupt vector to be input from the SCC 110. The address line MA13 135 connects to one input of an OR gate 136 and to an inverter 137. The output of the inverter 137, which is simply the inverse of the MA13 135 line, is the interrupt acknowledge signal 118 to the SCC 110. Thus, the MA13 signal 135 is in effect used by the microcomputer 100 to signal an interrupt acknowledge. The data strobe signal 138 from the microcomputer control bus 101 connects to the other input of OR gate 136. The output of OR gate 136 is the gated data strobe signal 117. For all normal operations when an interrupt acknowledge is not active, the MA13 line 135 is low, and therefore the gated dated strobe signal 117 is equivalent to the data strobe signal 138. The data strobe signal 138 also connects to the clock input of a D flip-flop 139. The D input of the flip-flop 139 is connected to the output of inverter 137 which is the inverted MA13 signal. Again, during all operations other than during an interrupt acknowledge, the MA13 signal 135 is low, the inverted MA13 signal is high, and so the flip-flop 139 remains set. The inverted output 140 of the flip flop 139 is connected to one input of an OR gate 141. The other input of the OR gate 141 is connected to the address strobe 142 from the microcomputer control bus 101. The output of OR gate 141 is the gated address strobe signal 116. As the flip-flop 139 remains set during non-interrupt acknowledge operations the flip-flop inverted output 140 remains low and the gated address strobe signal 116 is equivalent to the address strobe signal 142.

Referring to FIGS. 11, 12, and 13 the sequence used for inputting an interrupt vector from the SCC 110 involves the microcomputer 100 executing two consecutive machine cycles 145 and 146, the first being a read from address A000 (Hex) and the second being a read from address 8000 (Hex). In both read cycles, the MA15 address line 111 is active to select the SCC 110. In the first read 145 of address A000, the address line MA13 is also on, while in the second read 146 to address 8000 the address line MA13 is off. The results of this sequence of machine cycles is as follows. During the first cycle 145 of reading address A000, the MA13 bit is on and so the interrupt acknowledge line 118 is low (signalling an acknowledge to the SCC 110 as this is an active low signal). The data strobe signal 138 is blocked by OR gate 136 due to the high on MA13 and so the gated data strobe 117 remains high for this cycle. The address strobe signal 142 is not blocked by OR gate 141 because the flip-flop 139 has not as yet changed state and so the strobe appears on the gated address strobe line 116. On the positive edge of the data strobe 138 during the first machine cycle 145 the low output of inverter 137 is latched into the flip-flop 139 thus changing the state of flip-flop inverted output 140. During the next machine cycle 146 (read 8000), the address strobe signal 142 is blocked by OR gate 141 and so the gated address strobe signal 116 remains high. The MA13 address line is now low, and so the data strobe signal 138 passes through the OR gate 136 and generates an output strobe on the gated data strobe signal 117. The interrupt vector 143 from the SCC 110 becomes valid during the second machine cycle 146 (read 8000) and is strobed into the microcomputer by the gated data strobe signal 117.

Software Description

A network of the present invention is implemented in a link layer protocol at each station in the network. The software which implements a link layer of the present invention executes in the microcomputer 100 of FIG. 11, and is contained in an internal read only memory (not shown).

Figure 14:
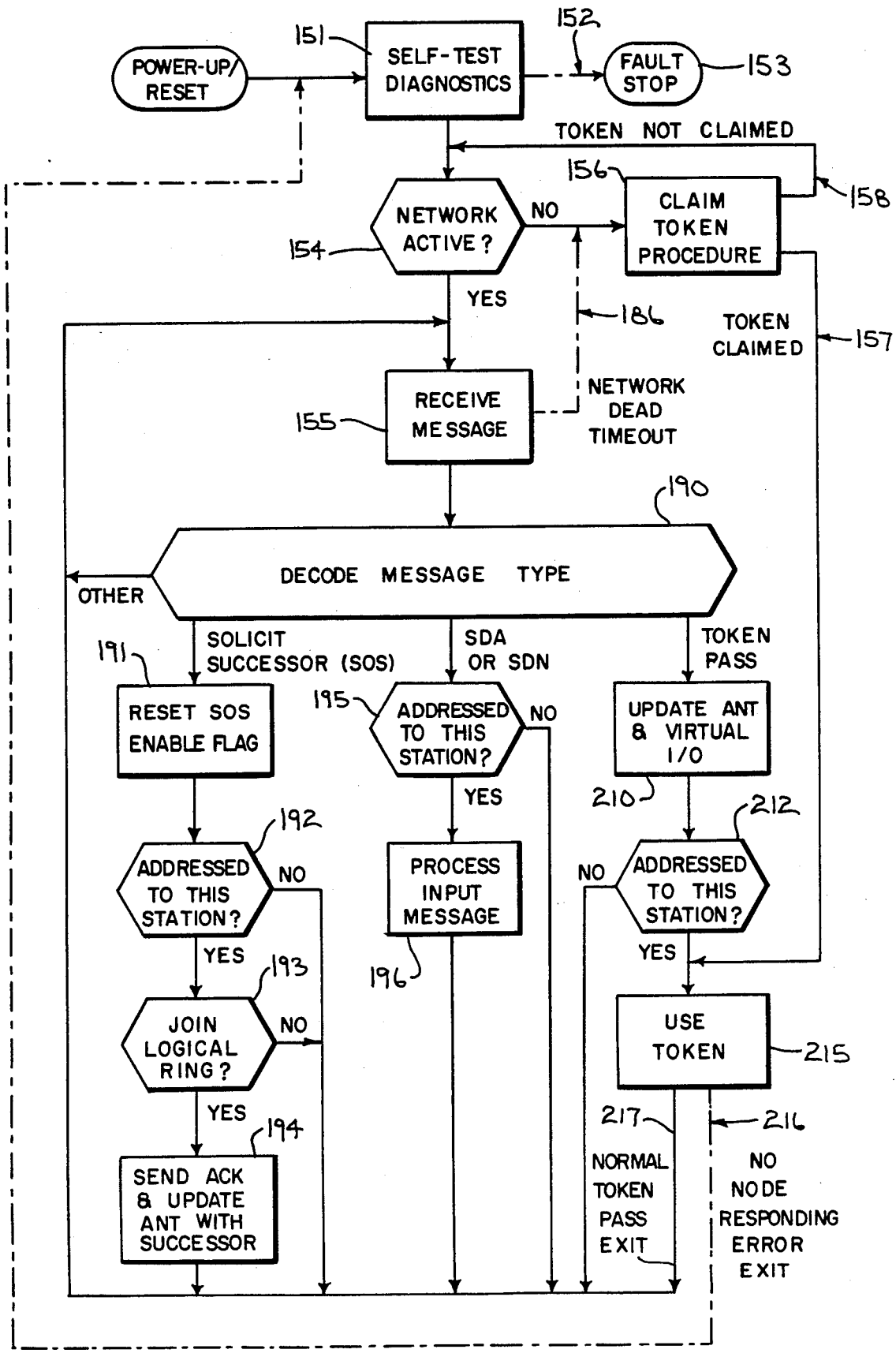
FIG. 14 is a flow chart of the program executed by the microcomputer of FIG. 11.

Referring to FIG. 14, when the microcomputer 100 is powered up or reset, a self-test diagnostics routine is run as represented by process block 151. If any error is detected in the self-test diagnostics 151 an error exit 152 is taken and a fault state 153 is entered and no further processing is performed until the system is reset. If the self-test is successful, processing continues at decision block 154 where the network is monitored to detect the presence of any activity on the bus 1.

If there is any activity heard on the network, processing continues to the receive message process block 155. If there is not any activity heard on the network at decision block 154 the network will continue to be monitored for a period of time equal to the network dead time-out value, 250 milli-seconds in this embodiment. After the network has been monitored for an amount of time equal to the network dead time-out value and there is still no activity heard on the bus, then processing transfers to the claim token procedure at process block 156. In the claim token procedure, a number of claim token messages are transmitted sequentially. The number of claim token messages sent depends on the station address, and is equal to the highest possible address minus the address of this station. Therefore, the lower the station address, the higher is the number of claim token messages sent. After sending the calculated number of claim token messages, the station listens to the bus 1 for a length of time proportional to the station address; the lower the address, the shorter the time. If no activity is heard on the bus 1, the token is claimed by this station and exit 157 is taken to the use token process block 160. If there is activity heard on the bus 1, then it is assumed that a lower addressed station is claiming the token by virtue of sending a greater number of claim token messages and exit 158 is taken back to decision block 154. At decision block 154, the bus is again monitored to insure that another station did claim the token and that the claiming station begins network activity. In any event, when network activity is detected at decision block 154, processing continues at the receive message process block 155.

Figure 15:
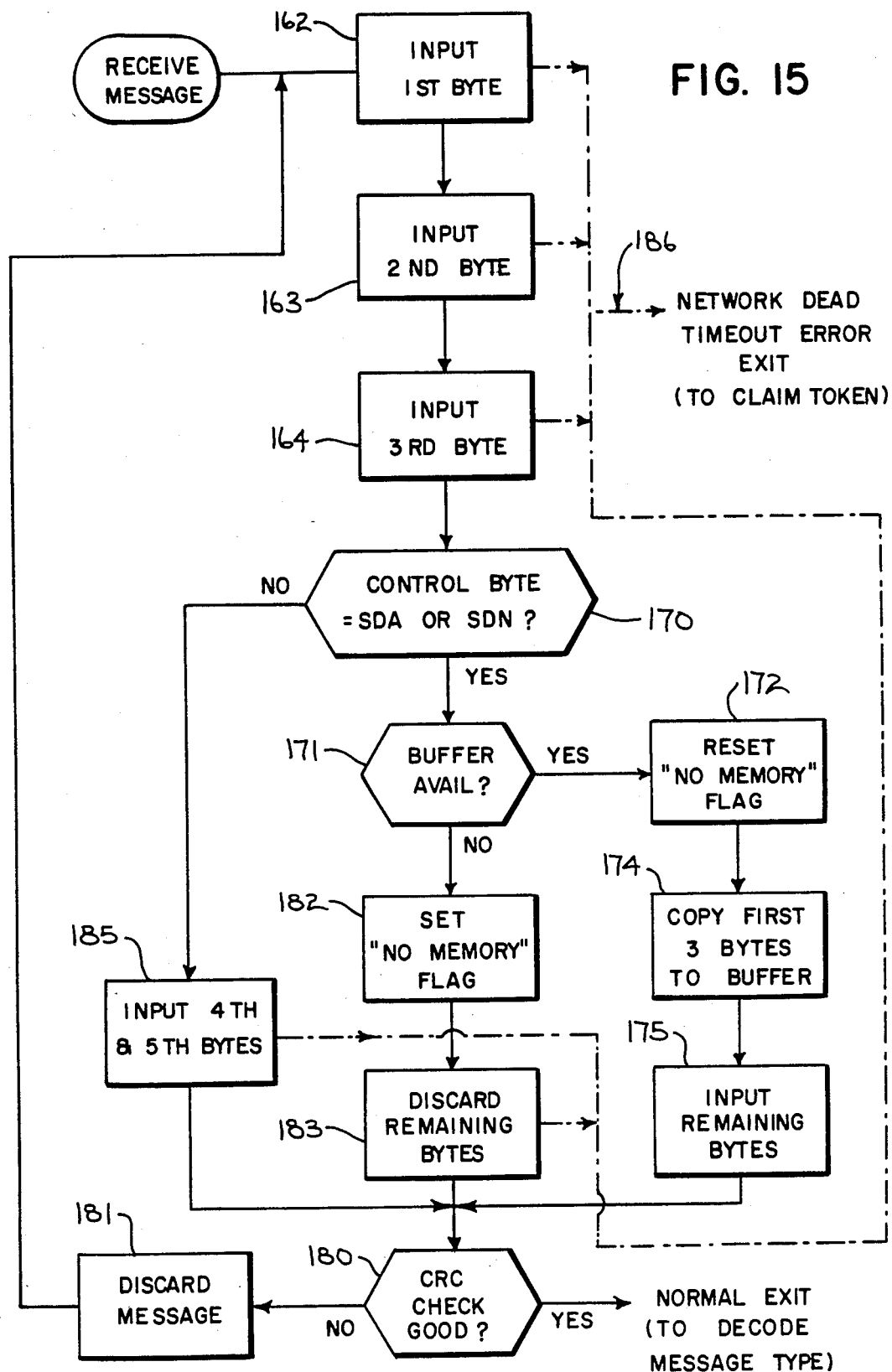
FIG. 15 is a flow chart of the program for receiving messages on the network which forms a part of the program illustrated in FIG. 14.
Figure 16:
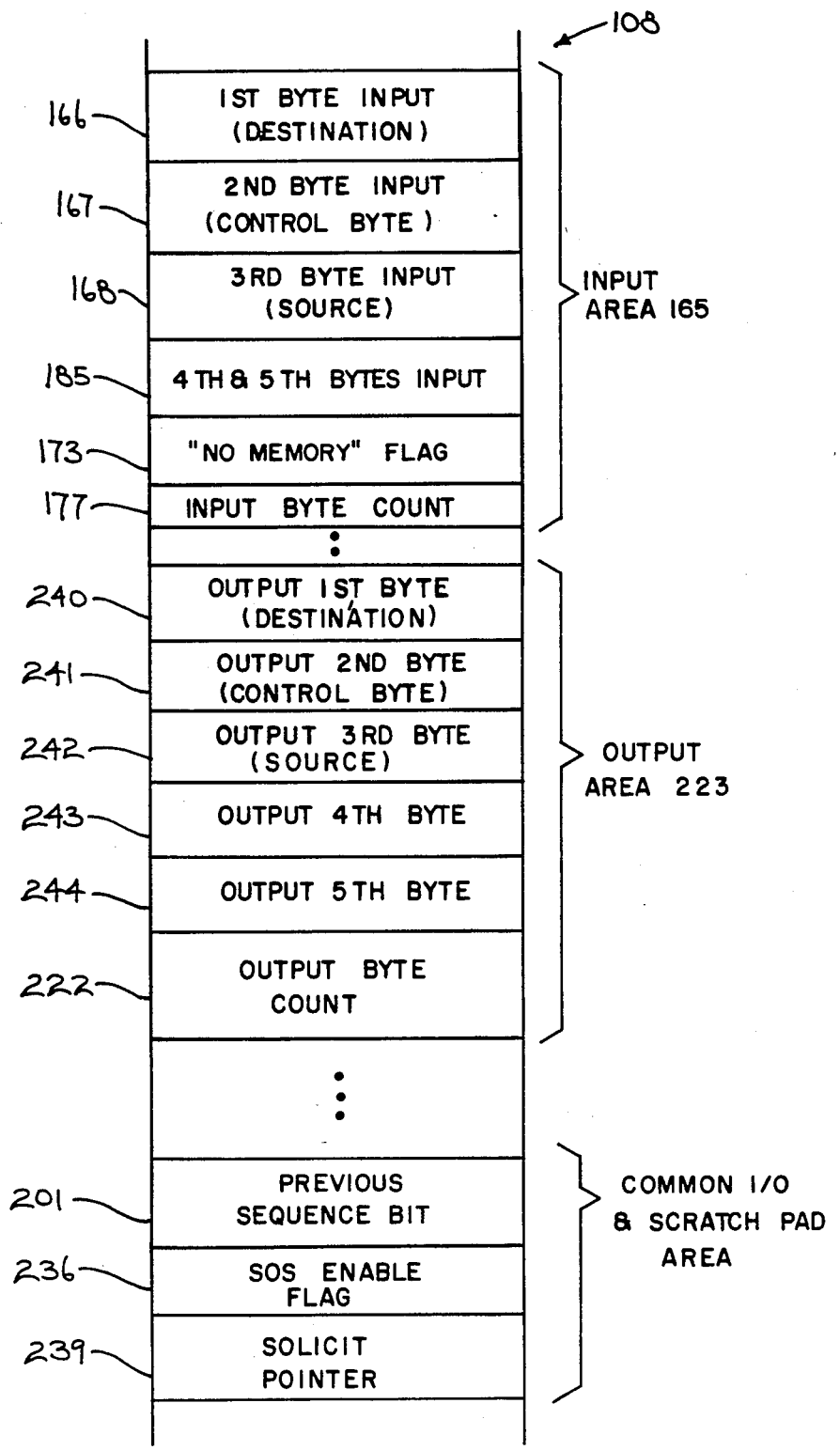
FIG. 16 is a map of the internal random access memory (RAM) of the microcomputer of FIG. 11.

Referring primarily to FIGS. 15 and 16, the receive message process block 155 monitors the network and receives incoming messages. The information from the network is received one byte at a time by the SCC 110. The SCC 110 generates one type of interrupt for each input byte and a second type of interrupt when the closing flags are detected signalling the end of the message. The input process is thus interrupt driven so that other tasks can be performed by the microcomputer 100 while awaiting input bytes. At process block 162 the first byte received is stored in the microcomputer internal memory 108 (FIG. 16) in an input area 165 at a designated location for the first byte input 166. As specified in the message format described above, the first byte of a message is always the destination address. Similarly at process block 163 the second byte is input, which is the control byte for the message, and is stored in the input area 165 at location 167. At process block 164 the third byte is input, which is the source address for this message, and is stored in the input area 165 at location 168. After the third byte is input, control passes to decision block 170 where the control byte 167 is examined to see if the message type for this message is either a Send Data with Acknowledge (SDA) or a Send Data with No Acknowledge (SDN). If either of these conditions are true, then the incoming message is a data type message. Control then passes to decision block 171 where a check is made to see if there is a buffer available in the RAM 67 (FIG. 7) to hold the remainder of the incoming bytes. The input count 87 (FIG. 10) maintained in the message buffer area 80 of the RAM 67 is a count of the number of input buffers available (i.e. not in use). In this embodiment there are 5 input buffers provided which are used in a circular fashion. A current input buffer pointer 86 points to the next input buffer available. If the input count B7 is greater than zero, then a buffer is available and control transfers to process block 172.

At process block 172, a "No Memory" flag 173 in the input area 165 of the microcomputer internal memory 108 is reset to indicate that a buffer was available. Then at process block 174, the first 3 bytes from the microcomputer internal memory 108 are copied to the input buffer 85 pointed to current input buffer pointer 86. Copying begins at the third location in the buffer as the first two bytes of the buffer are reserved for the message length which is filled in later. Then at process block 175 the remaining input bytes are input and placed in the input buffer 85 pointed to by the current input buffer pointer 86. The input of bytes into the input buffer continues until either the closing flags are detected signaling the end of the message or the input buffer 85 is filled. An input byte count 177 is maintained in the input area 165 of the microcomputer internal memory 108 (FIG. 16) as a count of the total number of bytes received. If the input byte count 177 exceeds the number of bytes which can be stored in one of the input buffers 85, the excess bytes are discarded and an error condition will be detected later by the excessive input byte count 177. When the closing flags 33 are finally received, the input processing is complete.

After the input processing is complete from process block 175, control transfers to decision block 180 where the Cyclical Redundancy Check (CRC) status is input from the SCC 110 and checked for validity. The CRC is automatically computed by the SCC 110 in well known fashion and compared with the CRC check characters 32 at the end of the message. The SCC 110 always hold the last two bytes received. So when the closing flags 33 are detected, those last 2 bytes are used by the SCC 110 for the CRC validity check. If the CRC check is good, as is normally the case, the receive message procedure 153 exits to the next process in FIG. 14, decode message type. If the CRC check is not good, there is an error in this message and this message is therefore discarded at process block 181. After discarding the message at block 181, the receive message process is started over from the beginning with inputting of the first byte of the next message at process block 162.

At decison block 171 if an input buffer 85 was not available to input the bytes of an incoming SDA or SDN type message, control is transferred to process block 182. In process block 182 the "no memory" flag 173 in the input area 165 of microcomputer internal memory 108 is set, which will be used later to send a "NAK-no memory" response if the incoming message requested acknowledgement (type SDA). After setting the "no memory" flag at process block 182, control transfers to process block 183 where the remaining bytes of the message are input and discarded. Input bytes continue to be discarded until the closing flags are detected, at which time control transfers to the CRC check decision block 180, where processing continues as described above.

Back at decision block 170, if the control byte did not indicate a message type of SDA or SDN, then this message is not a data message and control transfers to process block 184. At process block 184, fourth and fifth bytes may be input. A fourth byte would be input if the incoming message is a solicit successor message, (current successor address 44), and fourth and fifth bytes will be input if the input incoming message is a token pass (virtual I/O Data 43). There may not be any fourth or fifth bytes if the incoming message is a claim token or an ACK/NAK message. The fourth and fifth bytes, if received, are stored at 185 in the input area 165 of the microcomputer internal memory 108 (FIG. 16). If any bytes are received after the fifth byte, they are discarded. When the closing flags are detected, control transfers to decision block 180, where processing continues as described above.

Referring to FIG. 15, during the entire receive message process a network dead timer (not shown) internal to the microcomputer 100 is running. Each time a byte is received, the network dead timer is reset to the network dead time-out value, which for in the network in this embodiment is 250 milliseconds. If at any point in the receive message procedure the network dead timer times out before a subsequent byte is received or closing flags detected, an interrupt is generated from the network dead timer which causes an error exit 186 to be performed to the claim token procedure. This circumstance could arise, for example, if another station "dies" with the token. The claim token procedure will result in a replacement token being generated on the network.

Referring again to FIG. 14, the receive message procedure in process block 155 thus results in the input of a complete message with a valid CRC. Processing then continues to decision block 190 where the message type is decoded from the contents of the control byte 167. At decision block 190, the message type as indicated by the control byte 167 (2nd byte input) is examined. Specific actions are taken, as described below, for the message types Solicit Successor (SOS), token pass, and data messages, either type Send Data with Acknowledge (SDA) or Send Data with No Acknowledge (SDN). If the message is any other type (e.g. claim token, ACK/NAK, or an illegal type code) the message is discarded and decision block 190 exits back to the receive message procedure 155 to monitor for the next message. ACK/NAK messages are received separately in conjunction with the activity for which the ACK/NAK is expected (e.g. SDA or SOS messages) as described below.

Again at decision block 190, if the message type is solicit successor (SOS), control transfers to process block 191 where the SOS enable flag is reset. As will be explained below in conjunction with the use token procedure, the right to solicit is obtained by a station receiving the token twice in succession without hearing an intervening solicit successor message sent by another station. In this case, if an incoming message is a solicit successor message from another station, the SOS enable flag is reset indicating that this station does not have the right to solicit. After clearing the SOS enable flag, control transfers to decision block 192 where the destination 166 (first byte received) is examined to determine if the message is addressed to this station. If the message is not addressed to this station, then no further processing is needed and control transfers back to the receive message procedure at process block 155. The situation where the incoming solicit successor message is addressed to this station can only occur when the receiving station (i.e. this station) is not already in the logical ring as will be explained in greater detail below in conjunction with the use token procedure. In the event that this station is waiting to join the logical ring and receives a solicit successor message addressed to this station, control then passes to decision block 193 where a final decision is made whether or not to join the logical ring based on the current on-line status of this station. If this station does not want to joint the logical ring, control transfers back to the receive message procedure at process block 155. If however this node desires to join the logical ring, control transfers to process block 194, W where an Acknowledgement (ACK) is sent back to the soliciting station and the Active Node Table 20 (ANT) of this station is updated with the current successor address 44 information from the solicit successor message. The ACK message informs the soliciting station that this station, named in the source field 38 of the ACK message, desires to join the logical ring. Also at process block 194, the ANT 20 of this station is updated by storing the address of the current successor 44 named in the solicit message (4th byte received, from microcomputer internal memory 108 at location 185 in the ANT 20 at the location corresponding to the address of this station. This links the successor named in the solicit message to be the next token recipient after this station. An illustrative example of this procedure for adding a station to the logical ring is given in the general description of the invention above. After process block 194 control passes back to the receive message procedure at process block 155.

If the decoded message type in decision block 190 is either Send Data with Acknowledge (SDA) or Send Data with No acknowledge (SDN), then control is transferred to decision block 195 where the destination address field of the incoming message is checked to see if the data message is addressed to this station. If the data message is not addressed to this station then the message is discarded and processing transfers back to the receive message procedure at process block 155. If the data message is addressed to this station, then control transfers to process the input message at process block 196.

Figure 17:
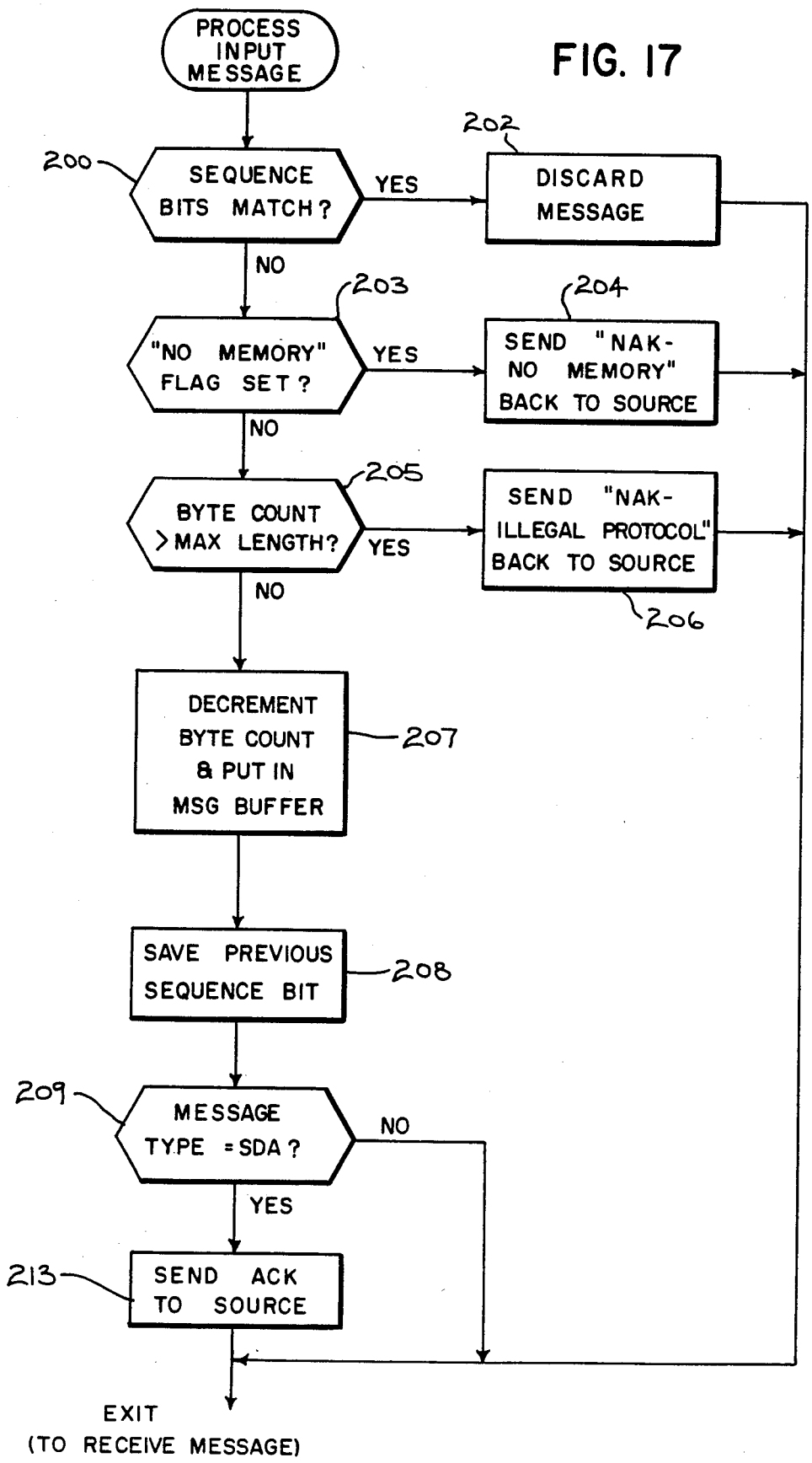
FIG. 17 is a flow chart of the program for processing an input message which forms part of the program illustrated in FIG. 14.

Referring to FIG. 17, the input message procedure begins at decision block 200 where a comparison is made between the sequence bit 41 in the control byte 37 of the message just received with the previous sequence bit 201 stored in the microcomputer internal memory 108 (FIG. 16). The sequence bit 41 is used to detect duplicate messages arriving at a station. When a station transmits more than one message to a single destination station, the sequence bit 41 in subsequent messages is toggled to the alternate state. Alternatively, if a message is intentionally repeated, as in a retry for lack of acknowledgement, the message is transmitted with the same sequence bit value. And so, if at process block 200 the sequence bit 41 of this message matches the previous sequence bit 201, then the message is a repeat and processing proceeds to process block 202 where the duplicate is discarded. The previous sequence bit 201 is flagged as being a "don't care"(i.e. destroyed) if any message other than a data message to this station is detected on the network. Therefore, the previous sequence bit 201 only applies to consecutive messages to a single station. After discarding the message, the input processing is complete and the procedure is exited back to the receive message procedure.

At decision block 200 if the sequence bits do not match, then this message is not a duplicate and processing continues at decision block 203 with a test of the "no memory" flag 173. This flag was set in the receive message procedure if an input buffer 85 could not be acquired to store the incoming bytes. If the "no memory" flag 173 is set, control transfers to process block 204 where a "Negative Acknowledgement (NAK) - no memory" message is sent back to the source of the data message just received. After sending the NAK the input message procedure exits back to the receive message procedure 15S.

If at decision block 203 the "no memory" flag 173 is not set, control transfers to decision block 205 where the input byte count 177 stored in the microcomputer internal memory 108 is examined to see if the maximum length limit of 272 bytes has been exceeded. If so, control transfers to process block 206 where a "Negative Acknowledge (NAK) - legal protocol" message is sent back to the source of the received message. After sending the NAK, the input message procedure exits back to the receive message procedure.

If at decision block 205 the input byte count 177 does not exceed the maximum length, processing continues at process block 207 where the input byte count 177 is descremented by one. The input byte count is decremented because the last byte put into the input buffer 85 was actually the first CRC byte as explained above with regard to FIG. 10. The input byte count 177 is then copied into the first 2 bytes of the input buffer 85 to indicate the message length to subsequent processes. The microprocessor system 65 of the communication section 52 (FIG. 7) is constantly polling the input buffers 85 and will detect the non-zero message length in the first two bytes of the input buffer 85. Upon detecting a non-zero message length, the microprocessor system 65 will then update the current input buffer pointer 86 and input count 87, and also transfer the contents of the input buffer 85 just received to the communications data area 62 in the shared RAM 55 of the local I/O section 51. The input count 87 is updated by incrementing the input count 87 by one thus making the input buffer 85 just transferred available for another input message. The current input buffer pointer 86 is updated by incrementing it to point to the next input buffer 85 in sequence, progressing from input buffer No. 1 to input buffer No. 2, to input buffer No. 3, and so on until the highest numbered input buffer (input buffer No. 5 in this embodiment) is reached. Then the current input buffer pointer 86 is updated to point back to input buffer No. 1. The use of the input buffers 85 thus progresses in a circular fashion. The microprocessor system 65 also zero's out the message length field in the first two bytes of the new input buffer 85 pointed to by the updated current input buffer pointer 86. In this way, the microprocessor system 65 will be able to detect completion of the next input message when a non-zero message length is placed in the input buffer 85 as described above.

After performing the updates in process block 207 control transfers to process block 208 where the sequence bit 41 from the control byte 37 of the message just received is saved in the microcomputer internal memory 108 as the previous sequence bit 201 for use in detecting potential subsequent repeats of this message.

Then at decision block 209, the message type is checked to see if it was a Send Data with Acknowledge (SDA). If so, then an acknowledge is being requested and control transfers to process block 213 where an ACK is sent back to the source indicating the successful error free reception and acceptance of this message. After process block 213 the input message procedure is exited back to the receive message procedure 155. If at decision block 209 the message type was not SDA, then an acknowledgement has not been requested and the input message procedure is exited back to the receive message procedure 155.

Referring again to FIG. 14, if the message type decoded in decision block 190 is a token pass, control passes to process block 210. At process block 210 the Active Node Table 20 and Virtual I/O W/R Table 82 are updated with the information contained in the token pass message. These updates are performed whether or not the token pass message is addressed to this station. All other stations are also receiving this same token pass message and also update their Active Node Tables 20 and Virtual I/O W/R Tables S2 in exactly the same way. To update the ANT 20, the 1st and 3rd bytes 166 and 168 of the received token pass message ar used. The 3rd byte input 168, identifies the source of the token pass message, in other words the address of the station which had the token. The lst byte input 166 identifies the destination of the token pass message, in other words the address of the station to which the token was passed. To update the ANT, the destination address (1st byte input) 166 is stored in the ANT 20 at the location corresponding to the source address (3rd byte input 168). This forms a link, or pointer, from the source station to the destination station in the ANT 20. By so monitoring and recording all such token passes on the network, a series of links, or pointers, are formed which eventually closes on itself thus forming a logical ring 211. In FIG. 9 the ANT 20 is filled in with illustrative data corresponding to the example network in FIG. 2b demonstrating this operation.

Similarly referring to FIG. 8, the Virtual I/O data 43 represented by the 4th and 5th input bytes 185 are stored in the Virtual I/O W/R Table 82 at the location corresponding to the source address (3rd input byte) 168. The Virtual I/O W/R table 82 thus contains the most current Virtual I/O data collected from each station during the sequence of passing the token around the logical ring. The Virtual I/O data may be used by the control section 50 in any manner desired. The ability to provide the virtual I/O communications facility in the token pass messages themselves results in greatly reduced overhead and rapid delivery.

After updating the tables 20 and 82, control passes to decision block 212, where the destination address (1st byte input) 166 of the incoming message is examined to determine if the token pass is addressed to this station. If the token is not addressed to this station, then no further processing is necessary and control transfers back to the receive message procedure 155. If the token pass is addressed to this station, then this station now possesses the token and control transfers to the use token procedure in process block 215. The use token procedure 215 is fully described below, and consists of processing output messages, checking for the right to solicit, and if so, performing such solicitation, and eventually passing the token to the next station in the logical ring. If the use token procedure 215 in attempting to pass the token can find no other station on the network which will respond to the token pass, an error exit 216 is taken to transfer control back up to the self-test diagnostic procedure in process block 151. This would be a very unusual condition, because the use token procedure uses the Active Node Table to attempt a token pass to any station on the network that will respond, and so this error exit represents a serious malfunction on the network. One possible cause for a no-node responding error is, for example, if the station with the token were to become unplugged from the network. In that case, the station would find itself alone on the network and constantly solicit for other stations. In most cases, the normal token pass exit 217 will be taken to transfer control back to the receive message procedure 155.

Figure 18:
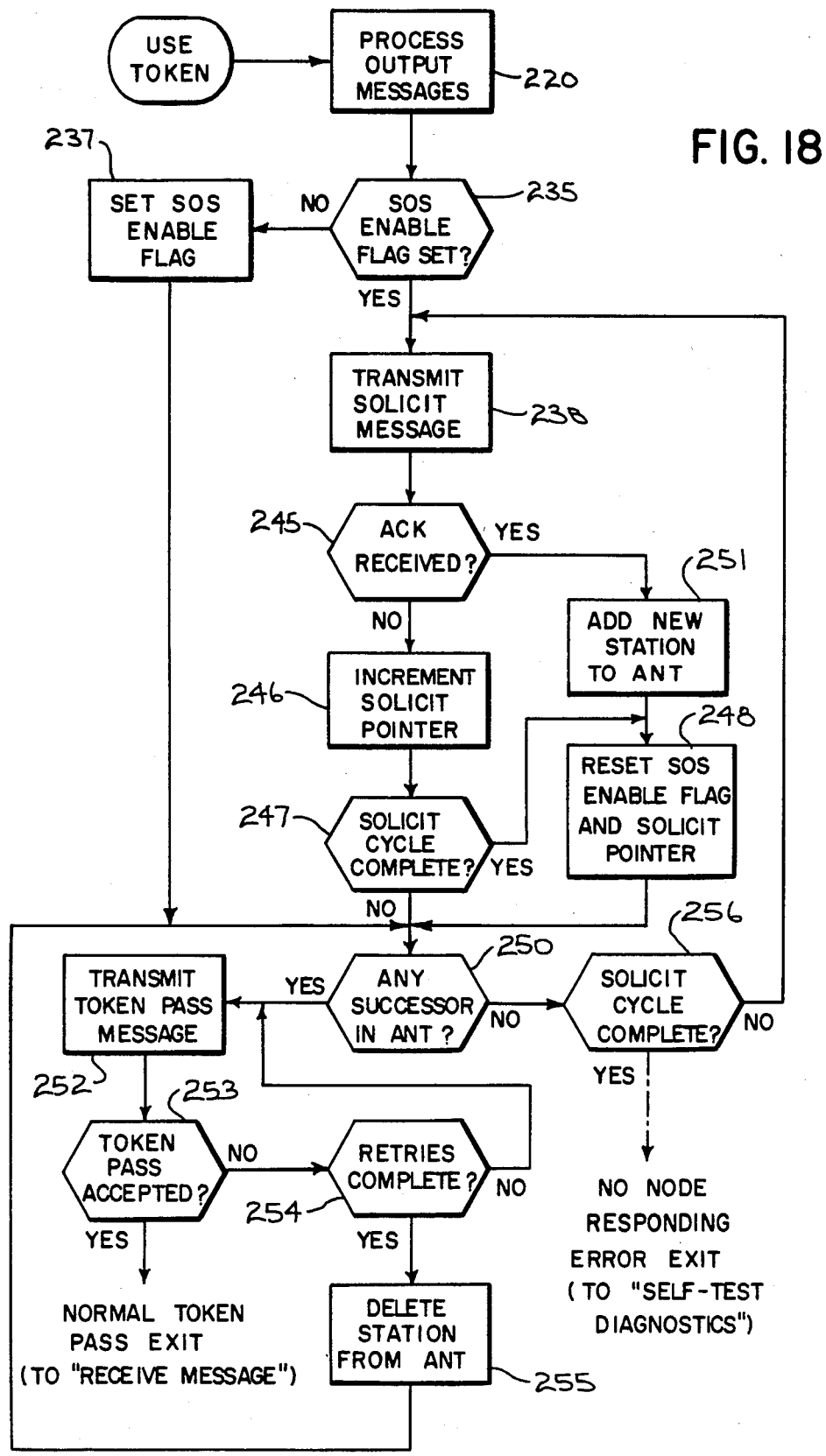
FIG. 18 is a flow chart of the program for using the token which forms part of the program illustrated in FIG. 14.

Referring to FIG. 18, the use token procedure is entered when this station acquires possession of the token. The use token procedure begins at process block 220 with the processing of output messages.

Figure 19:
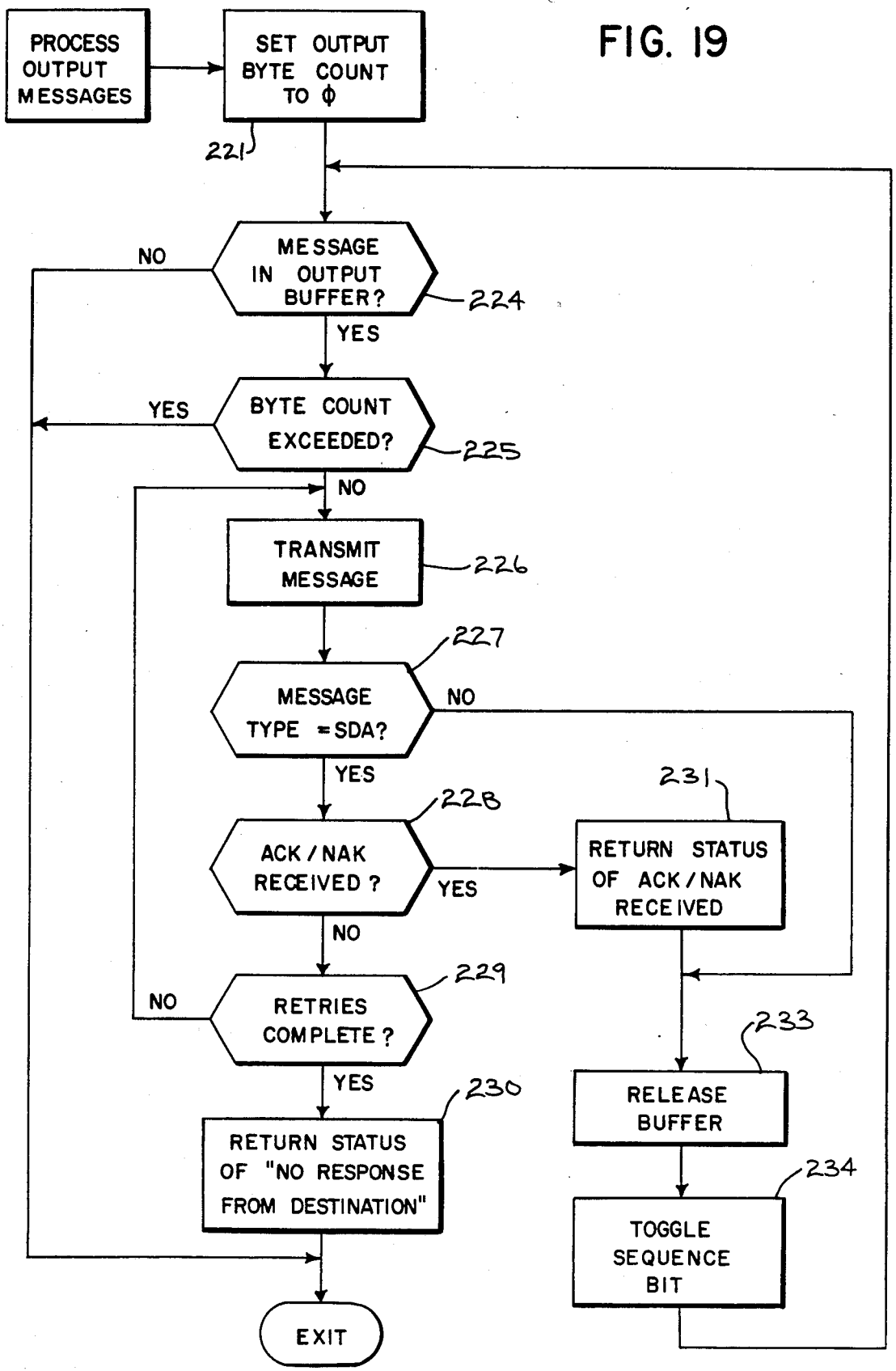
FIG. 19 is a flow chart of the program for processing output messages which forms part of the program illustrated in FIG. 18.

Referring to FIGS. 10, 16, and 19 the processing of output messages begins at process block 221 where an output byte count 222 in an output area 223 of the microcomputer internal RAM 108 is set to "0". The output byte count 222 is used to limit the total number of bytes transmitted during any one token possession to a maximum of 271 bytes, which is the maximum length for a single message. This 271 bytes may, however, consist of several messages of smaller length. If more than one message is waiting to be transmitted, additional messages will be accepted for transmission unless such an additional message would cause the output byte count 222 to exceed the maximum.

After setting the output byte count to 0, control transfers to decision block 224 to see if there is a message waiting to be transmitted in one of the output buffers 88. There are two output buffers 88 in the message buffer area 80 of the RAM 67 (FIG. 10) where output messages waiting for transmission are placed by the microprocessor system 65. An output count 80 in the message buffer area 80 is used to indicate the number of output buffers (either 0, 1, or 2) which contain a message for transmission. If the output count is greater than 0, then a message is waiting to be transmitted in an output buffer 88, and the current output buffer pointer 89 in the message buffer area 80 points to the first such output buffer. If at decision block 224 the output count is 0, then there are no messages waiting for transmission and the process output message routine is exited. If, however, there is at least one message waiting for transmission, control transfers to decision block 225 where the output byte count 222 is tested. The length of the message waiting for transmission is contained in the first two bytes of the output buffer 88 pointed to by the current output buffer pointer 89. This length is added to the current output byte count 222 and the sum is saved as an updated output byte count 222. If the sum exceeds the maximum byte count of 271 bytes, then this message cannot be transmitted during this token possession and the process output message routine is exited. If the maximum byte count is not exceeded, then control transfers to process block 226.

At process block 226 the message in the output buffer 88 pointed to by the current output buffer pointer 89 is transmitted. The transmission starts with the third byte in the buffer, as the first two bytes in the buffer contain the message length. The actual transmission is interrupt driven, transferring one byte at a time to the SCC 110 for transmission onto the bus 1. The message as it resides in the output buffer 88 has been properly formated for transmission by the control section 50 when it originated the message, with the message length in the first two bytes followed by a destination address 36, control byte 37, source address 38, and packet data 39. However, before transmission begins, the microcomputer 100 sets the previous sequence bit 201 to zero and copies it into the first bit position of the control byte 37 so that duplicate messages can be detected as described above. Transmission continues until the number of bytes indicated by the message length field in the output buffer 88 have been sent.

After the last byte of the message has been transmitted control transfers to process block 227 where a test is made to see if the message just transmitted was a Send Data with Acknowledgement (SDA) type message. If the message type of the message just transmitted was SDA, then an acknowledgement is expected from the destination station and control transfers to decision block 228 where reception of the acknowledgement is awaited. While waiting for the acknowledgement at decision block 228 an internal timer (not shown) is running to wait for an amount of time called the slot time-out value, which for the network in this embodiment is equal to 1.5 milliseconds. If either there are no characters received on the network by the time the slot time-out timer has expired, or if any message received is not a proper acknowledgement addressed to this station, control transfers to decision block 229. IO At decision block 292 a test is made to see if the retries are complete. A maximum of 3 retries are allowed (4 total transmissions of the message). If there are retries remaining to be taken control transfers back to process block 226 where the message is again transmitted. If all of the retries have been exhausted control transfers to process block 230 where a status code for "no response from destination" corresponding to the output buffer 88 just sent is returned to the control section 50. After returning the status for the unsuccessful transmission, the output buffer 88 is released and the process output message routine is exited.

Back at decision block 228 if a proper acknowledgement (ACK) or no acknowledgement (NAK) message is received before the slot time-out timer expires, control transfers to process block 231, where the appropriate status (ACK or NAK) corresponding to the output buffer 88 just sent is returned to the control section 50.

Process block 232 is entered either after the ACK-/NAK status has been returned in process block 231 or if the message type did not require acknowledgement at decision block 227. In either of these cases, the output buffer 88 just used is released at process block 233 by clearing the first two bytes of the output buffer 88 which contain the message length. The microprocessor system 65 is constantly polling the output buffers 88 and will detect the clearing of the message length. The microprocessor system 65 then responds by decrementing the output count 90 and updating the current output buffer pointer 89 to point to the other output buffer 88. And finally, at process block 234 the previous sequence bit 201 is toggled to the alternate state in preparation for the potential transmission of a subsequent message. After toggling the previous sequence bit 201 at process block 234 control transfers back to decision block 224 to see if there are any more messages waiting for transmission. Eventually, either all messages waiting for transmission will be transmitted (block 224) or the maximum byte count for this token possession will be exceeded (block 225) and the process output message routine will be exited.

Referring back to FIG. 18, after all of the output messages have been processed at process block 220 control passes to decision block 235 where the state of the solicit successor (SOS) enable flag 236 in the microcomputer internal RAM 108 (FIG. 16) is tested. The SOS enable flag 236 is used to determine whether or not this station has the right to solicit. The right to solicit is obtained by a station when there have been no other solicit successor messages heard on the bus 1 since the last time that station possessed the token. As mentioned above, if any solicit successor message is detected at decision block 190, the SOS enable flag 236 is reset. So if at decision block 235 the SOS enable flag 236 is not set then this station does not have the right to solicit and control passes to process block 237. At process block 237 the SOS enable flag 236 is set and the remainder of the solicitation process is bypassed. If at decision block 235 the SOS enable flag 236 is set, then there has been no intervening solicit successor messages since this station last possessed the token and this station therefore now has the right to solicit.

Referring to FIGS. 16 and 18, control then transfers to process block 238 where the solicit message is transmitted. In preparation for transmission, the solicit message is assembled in the output area 223 of the microcomputer internal memory 108. The output first byte, which is the destination, or target, of the solicit message is filled in with the value of a solicit pointer 239. The solicit pointer 239 is maintained in the microcomputer internal memory 108 and contains the address of the next station to be solicited. In a solicit cycle, each address between the address of this station and the address of the next known successor station (from the ANT 20) is solicited, but only one solicit message is transmitted for each possession of the token. In other words only one solicit message is transmitted for each complete rotation of the token around the logical ring. The output second byte 241, the control byte, is filled in with message type of "1" to indicate that this is a solicit successor message. The output third byte 242, the source, is filled in with the address of this station as read from the node address switches 107. And finally, the output fourth byte 243 is filled in with the current successor address which is obtained from the Active Node Table 20 at the location corresponding to the address of this station (i.e. this station's current successor). The output byte count 222 is filled in with "four" to indicate that there are four bytes in this message. The message thus formatted and contained in the microcomputer internal memory 108 is transmitted. Referring again to FIG. 18, when transmission of the solicit message is complete, control transfers to decision block 245 where the network is monitored for reception of an acknowledgement from the station being solicited. A period of time equal to the slot time-out value is allowed for the station being solicited to respond. If a valid acknowledgement addressed to this station is not received within that period of time, then it is assumed that there is no station existing at the solicited address and control transfers to process block 246 where the solicit pointer 239 is incremented to point to the next sequential address. After incrementing the solicit pointer, control transfers to decision block 247 where a test is made to see if the solicit cycle is complete. Completion of the solicit cycle is indicated by the solicit pointer being equal to the known successor for this station from the ANT 20. In that case, every address between the address of this station and the next known successor has been solicited without any response and this solicit cycle is therefore complete.

Control then transfers to process block 248 where the SOS enable flag 236 is reset to allow subsequent stations to obtain the right to solicit, and the solicit pointer 239 is reset to point to the first address after the address of this station. Control then transfers to decision block 250.

Back at decision block 245, if a valid acknowledgement is received in response to the solicit message, then a new station waiting to join the logical ring has been found and control passes to process block 251. At process block 251 the new station is added to the Active Node Table 20 of this station by storing the address of the responding station (obtained from the source address 3S from the acknowledge message) in the Active Node Table 20 at the location corresponding to the address of this station. The responding station is therefore linked to be the next successor after this station. Also, the previous successor for this station is now the successor for the newly added station, and so the address of the previous successor station is stored in the Active Node Table 20 at the address corresponding to the address of the newly added station. The Active Node Table 20 for this station thus contains a complete map of the logical ring including the newly added station.

The Active Node Tables of all other stations do not as yet reflect the addition of this new station because there have been no actual token passes. When the token pass to the new station actually occurs, all of the other stations will incorporate that new station into their Active Node Tables, and when the new station subsequently passes the token to its successor, then all the stations will have completed patching the new station into their Active Node Tables. After adding the new station to the Active Node Table 20 at process block 251 processing continues at process block 248 by resetting the SOS enable flag and solicit pointer as described above. This is because the addition of a new station also constitutes the completion of a solicit cycle because all intervening addresses between this station and the newly added station have been solicited. It will be the responsibility of the newly added station to further solicit addresses between that newly added station and its successor station.

At the completion of all solicitation processing, be it either from process block 237, decision block 247, or process block 248, control transfers to decision block 250. At decision block 250 the process of actually passing the token begins by checking the Active Node Table 20 to see if a successor exists for this station. A successor in the Active Node Table 20 is indicated by having the location in the Active Node Table 20 corresponding to the address of this station contain a pointer to any station other than this station. In other words, if a station points to itself, then there is no successor. When the Active Node Table 20 is initialized during power on or reset, each location in the Active Node Table 20 is set to point to itself. As the Active Node Table 20 is updated as described above, the locations in the Active Node Table 20 corresponding to the stations in the logical ring are changed such that each location contains a pointer to the successor station in the logical ring. If at decision block 250 a successor address is found in the Active Node Table 20, control passes to process block 252 where the token pass message is transmitted. The token pass message is assembled in the microcomputer internal memory 108 by filling in the output first byte 240 with the address of the successor obtained from the Active Node Table 20. The output second byte 241 is filled in with the message type "0" to specify a token pass message. The output third byte 252 is filled in with the address of this station as read from the node address switches 107. The output fourth byte 243 and the output fifth byte 244 are filled in with the two bytes of virtual I/O data 43 obtained from the virtual I/O W/R Table 82 in the RAM 67 at the location corresponding to the address of this station. This virtual I/O data represents the most current data for this station which is being sent to all other stations in the logical ring. The token pass message thus formatted in the microcomputer internal memor 108 is transmitted by sending the output bytes to the SCC 110 on an interrupt driven basis. The output byte count 222 is filled in with five to indicate that there are five bytes in this message.

When the transmission of the token pass message at process block 252 has been completed, control passes to decision block 253 where a test is made to see if the token pass message has been accepted. To determine whether the token pass has been accepted or not, the station which transmitted the token pass monitors the network for a period of time equal to the slot time-out value to see if there is any activity on the network. Any network activity so detected indicates that the recipient station has accepted the token and has commenced transmission of either data, a solicit successor message, or another token pass. If any network activity is heard it is assumed that the token has been accepted by the recipient station and the use token procedure exits back to the receive message procedure 155 of FIG. 14. If, on the other hand, at decision block 253 the slot time-out period expires without detecting any activity on the network, then control transfers to decision block 254 where a test is made to see if the retries for this token pass have been exhausted. A total of 3 retries are allowed for the token pass message. If there are any retries remaining, control transfers back to process block 252 where the token pass message is again transmitted. If all of the retries have been completed at decision block 254, control transfers to process block 255.

At process block 255, the station which has failed to accept the token pass is presumed to have dropped off the network or to otherwise have become disabled. Accordingly, it is deleted from the logical ring (i.e. from the Active Node Table 20). To delete the non-responding station from the Active Node Table 20, this station (the station attempting to pass the token) will first obtain from the Active Node Table 20 the address of the successor station for the station which is being deleted. The address of that successor station will then become the new successor for this station. In other words, the pointer in the Active Node Table 20 at the location corresponding to the non-responding station is moved to the address corresponding to this station. The non-responding station is thus patched out of the logical ring as described above in the general description of the invention. Finally, the location in the Active Node Table 20 corresponding to the deleted station is reset to a value equal to the address of the deleted station (i.e. points to itself) as are all other locations in the Active Node Table 20 corresponding to stations not in the logical ring.

Having deleted the non-responding station at process block 255, control transfers back to decision block 250 where the Active Node Table 20 is again interrogated to see if this station has a successor in the Active Node Table 20. It is possible that after the process of deleting a non-responding station as described above, the new successor station may also not respond to the token pass message. In that event, the above described steps of transmitting the token pass message 252, monitoring the bus for acceptance 253, retrying the message 254, and eventually deleting the non-responding station 255 can continue exactly as before. This is possible because of the use of the Active Node Table 20 to identify all remaining stations in the logical ring and the order in which they pass the token. Prior networks, which contain only the address of the next immediate successor and the next immediate predecessor cannot tolerate such multiple sequential station failures without reinitializing the network from scratch. Using the Active Node Table 20 of the present invention allows any number of station failures in any order to be tolerated simply by updating the Active Node Table 20 accordingly. The process of deleting stations from the Active Node Table 20 can be carried out until ultimately there is only one station left in the logical ring (this station). Thus at decision block 250, a successor may not be found in the Active Node Table 20 either in the case that all remaining stations have been deleted or in the event that this is the first station to come up on a network. In either case, if there is no successor in the Active Node Table 20 for this station control passes to decision block 256.

Since there is no successor in the logical ring to which to pass the token, there is nothing for this station to do, except solicit for further stations. Therefore, a test is made at decision block 256 to see if the solicit cycle has been completed as described above. If the solicit cycle has not been completed, control transfers back to process block 238 for the transmission of further solicit messages. Note that when this station is the only station in the logical ring, the right to solicit is obtained by virtue of the fact that this station is in essence passing the token to itself. Also, the solicit messages can be transmitted repeatedly since there is no logical ring for the token to traverse. Solicitation therefore continues until either a successor station is found or the solicit cycle is completed. If the solicit cycle is complete at process block 256, it indicates that all addresses other than the address of this station have been solicited, and that no response has been received and there is still no successor for this station in the Active Node Table 20. In that event, decision block 256 takes the "no node responding error exit" back to the self-test diagnostic process block 151 of FIG. 14. If the self-test diagnostics indicate that this station is still functioning properly, the above process of soliciting all other stations and going back to the self-test diagnostics will be repeated continually.

There has been described above a preferred embodiment of the invention based on a serial bus communications network. It should be apparent to those skilled in the art that any form of communication such as, for example, a parallel bus, or backplane, is equally suitable for use with this invention. Further, since the physical location of the stations is irrelevant, some stations may even reside in a common rack and still form a logical ring according to the present invention using any available communications media.

We claim:

1. A method for operating a station on a token passing logical ring network, the station including a memory for storing data for use by the station, the method comprising the steps of:
   (a) receiving messages from the network, said messages containing information fields identifying the source, the destination, and the type of the message;
   (b) decoding the type of the message from said type information field;
   (c) establishing an Active Node Table in said memory by repeating steps (a) and (b) for every message on the network, and if the type of the message as decoded in steb (b) is a token pass, then storing the source and destination information from every such token pass message in the Active Node Table to indicate that both the source and the destination are in the logical ring and that the destination follows the source in the sequence of passing the token, thereby updating the Active Node Table with the identity of every station in the logical ring and the sequence in which the token is passed.

2. The method of claim 1 in which if the destination of the token pass message in step (c) is said station, then the station assumes possession of the token and further performs the steps of:
   (e) looking up in the Active Node Table the next destination in said token passing sequence; and
   (f) sending a token pass message to the next destination.

3. The method of claim 2 in which if the next destination fails to accept the token, then the station further performs the steps of:
   (g) modifying the token passing sequence by deleting the destination failing to accept the token from the Active Node Table; and
   (h) repeating the step of (e) and (f) using the modified token passing sequence.

4. The method of claim 3 in which the steps (g) of modifying the token passing sequence and (h) repeating the steps (e) and (f) are repeated iteratively for each destination that fails to accept the token.

5. The method of claims 2, 3, or 4 in which during said possession of the token and before steps (e) and (f) the station further performs the steps of:
   (i) sending a solicit message to solicit for another station waiting to join the logical ring; and
   (j) if the other station responds to the solicit message, then adding the other station to the Active Node Table as being next in the token passing sequence after the station.

6. The method of claim 1 in which the station is on the network and waiting to join the logical ring and the type of message as decoded in step (b) is a solicit message addressed to said station, said solicit message containing an information field identifying a current successor, the station further performing the steps of:
   (k) updating the Active Node Table to indicate the current successor as being next in the token passing sequence after the station; and
   (l) sending an acknowledge message to the source of the solicit message.

7. The method of claim 1, 2, or 4 further comprising the step of:
   (m) forming an Active Node Status Word based on the information in the Active Node Table, said Active Node Status Word indicating the identity of each station active in the logical ring without regard to the order in which the token is passed.

8. The method of claims 1, 2 or 4 in which the token pass message includes a data field, and further comprises the step of;
   (n) storing the data field from every token pass message in the memory at a location corresponding to the source of the token pass message, thereby forming a data table.

9. A station for a token passing logical ring network having a plurality of such stations interconnected by a broadcast communications media, the station comprising:
   sending means for transmitting an output message on the network;
   receiving means for receiving an input message from the network;
   processor means coupled to the sending means and receiving means for processing the input and output messages, said processor means including:
   decoding means for determining the type of the input message;
   memory means for storing the input and output messages, said memory means including an Active Node Table (ANT) which contains data indicating both the identity of each of said plurality of stations currently in the logical ring and the order in which the token is passed;
   ANT updating means coupled to the decoding means and the memory means for updating the ANT in response to an indication from the decoding means that the input message was a token pass message.

10. The station as recited in claim 9 wherein the processor means further includes means for generating an Active Node Status Word (ANSW) based on the information contained in the ANT to identify every station currently active in the logical ring.

11. The station as recited in claim 9 or 10 wherein the memory means further includes data table means and the processor means includes means for extracting data from a data field in the token pass message and storing the data in the data table at a location corresponding to the source of the token pass message.

12. The station as recited in claim 9 wherein the processor means further includes token using means for exercising control over the media, said token using means being activated in response to an indication from the decoding means that the input message was a token pass addressed to this station, wherein said token using means passes the token by looking up in the ANT the identity of the next station in the logical ring after this station and sending a token pass message to said next station, whereby the token using means of this station is deactivated upon acceptance of the token pass message.

13. The station as recited in claim 12 wherein if the token pass message to the next station is not accepted, then the token using means retries sending the token pass message until the token pass message is accepted up to a predetermined maximum number of retries, wherein if the next station still fails to accept the token pass message after the maximum number of retries, then the token using means deletes the next station from the ANT of this station and looks up in the ANT the identity of a new next station following the deleted station to be used in subsequent token pass attempts.

14. The station as recited in claim 12 or 13 in which the token using means further includes soliciting means for soliciting stations waiting to join the logical ring, wherein the soliciting means sends a solicit message and if the station waiting to join the logical ring responds to the solicit message, the soliciting means adds the identity of the waiting station to the ANT of this station.

15. A method for operating a station on a token passing logical ring network, the station including a memory for storing data for use by the station, the method comprsing the steps of:
 (a) receiving messages from the network, said messages containing information fields identifying the source, the destination, and the type of the message;
 (b) decoding the type of the message from said type information field;
 (c) establishing a data table in said memory by repeating steps (a) and (b) for every message on the network, and if the type of the message as decoded in step (b) is a token pass, then extracting a data field from the token pass message and storing the daat field in the memory at a location corresponding to the source of the token pass message.

* * * * *

UNITED STATES PATENT AND TRADEMARK OFFICE
CERTIFICATE OF CORRECTION

PATENT NO. : 4,747,100
DATED : May 24, 1988
INVENTOR(S) : J. Monte Roach et al.

It is certified that error appears in the above-identified patent and that said Letters Patent is hereby corrected as shown below:

In Column 1,
    at Line 55, change "predeceessor" to --predecessor--.
In Column 3,
    at Line 57, change "virtual" to --Virtual--.
In Column 31,
    at Line 40, change "steb" to --step--.
In Claim 15,
    at Line 9, change "comprsing" to --comprising--.
In Claim 15,
    at Line 22, change "daat" to --data--.

Signed and Sealed this

Twenty-fourth Day of January, 1989

*Attest:*

DONALD J. QUIGG

*Attesting Officer*     *Commissioner of Patents and Trademarks*